US009353519B2

(12) United States Patent
Williams

(10) Patent No.: US 9,353,519 B2
(45) Date of Patent: May 31, 2016

(54) AUTOMATED APPARATUS FOR CONSTRUCTING ASSEMBLIES OF BUILDING COMPONENTS

(75) Inventor: Jeffrey P. Williams, Hillsborough, NC (US)

(73) Assignee: Williams Robotics, LLC, Hillsborough, NC (US)

( * ) Notice: Subject to any disclaimer, the term of this patent is extended or adjusted under 35 U.S.C. 154(b) by 503 days.

(21) Appl. No.: 13/988,705

(22) PCT Filed: Sep. 27, 2011

(86) PCT No.: PCT/US2011/053347
§ 371 (c)(1),
(2), (4) Date: Jul. 15, 2013

(87) PCT Pub. No.: WO2012/047603
PCT Pub. Date: Apr. 12, 2012

(65) Prior Publication Data
US 2013/0283618 A1   Oct. 31, 2013

Related U.S. Application Data

(60) Provisional application No. 61/387,192, filed on Sep. 28, 2010.

(51) Int. Cl.
*B23Q 3/00* (2006.01)
*B23P 21/00* (2006.01)
(Continued)

(52) U.S. Cl.
CPC . *E04B 2/00* (2013.01); *B27F 7/003* (2013.01); *B27F 7/006* (2013.01); *Y10T 29/49629* (2015.01); *Y10T 29/53* (2015.01)

(58) Field of Classification Search
CPC .............. Y10T 29/53; Y10T 29/49629; Y10T 29/49895; Y10T 29/49904; Y10T 29/49998; Y10T 29/53187; Y10T 29/53365; Y10T 29/534; Y10T 29/49623; E04B 2/00; B27F 7/006; B27F 7/003
USPC ........ 29/464, 469, 559, 700, 783, 791, 897.3, 29/798.32
See application file for complete search history.

(56) References Cited

U.S. PATENT DOCUMENTS

| 2,983,292 A | 5/1961 | Mckinley |
| 3,592,376 A | 7/1971 | Moehlenpah |

(Continued)

OTHER PUBLICATIONS

Supplemental European Search Report for corresponding European application No. EP11831261, dated Apr. 22, 2014, 4 pages.
(Continued)

*Primary Examiner* — Moshe Wilensky
*Assistant Examiner* — Darrell C Ford
(74) *Attorney, Agent, or Firm* — Myers Bigel & Sibley, P.A.

(57) ABSTRACT

A system for constructing wall panels comprising a plurality of structural members includes: a source of structural members of predetermined size; a horizontal table configured to support planks as they are being formed into a wall panel, the table including a stationary section and a movable carriage that is configured to move in a longitudinal direction toward and away from the stationary section; an articulated arm unit having a gripper, the articulating arm unit positioned to retrieve boards from the source with the gripper and place them on the table; at least one first clamping unit mounted to the stationary section for clamping structural members thereto; at least one second clamping unit mounted to the movable carriage for clamping structural members thereto; and a controller that controls the movement of the articulating arm unit and the movable carriage.

11 Claims, 21 Drawing Sheets

(51) Int. Cl.
  *B23Q 7/00* (2006.01)
  *B23P 19/00* (2006.01)
  *B21D 47/00* (2006.01)
  *B23P 17/00* (2006.01)
  *E04B 2/00* (2006.01)
  *B27F 7/00* (2006.01)

(56) References Cited

U.S. PATENT DOCUMENTS 3,789,101 A * 1/1974 Wright et al. ............... 264/261
3,877,132 A * 4/1975 Fogle ............................ 227/22
4,567,821 A   2/1986 Mcdonald
4,620,658 A   11/1986 Martin
5,021,108 A * 6/1991 Bergqvist ...................... 156/79
5,095,605 A * 3/1992 Tonus ............................ 29/432
5,555,617 A * 9/1996 Pope ............................. 29/772
7,172,064 B2 * 2/2007 Alversson ..................... 198/817
2001/0034930 A1 * 11/2001 Phillips et al. ............... 29/33 R
2004/0002787 A1   1/2004 Koskovich
2007/0226978 A1 * 10/2007 Sprague et al. ............. 29/34 B
2008/0172983 A1 * 7/2008 Urmson ..................... B27B 5/02
                                                    52/745.19
2010/0057242 A1 * 3/2010 Williams et al. .............. 700/114
2010/0061829 A1 * 3/2010 McAdoo et al. ......... 414/222.02
2010/0154218 A1   6/2010 Turulin

OTHER PUBLICATIONS

International Search Report for corresponding PCT Application No. PCT/US2011/053347, Date of mailing Feb. 14, 2012.

* cited by examiner

AUTOMATED APPARATUS FOR CONSTRUCTING ASSEMBLIES OF BUILDING COMPONENTS

RELATED APPLICATIONS

This application is a 35 USC §371 national phase application of PCT/US2011/053347, filed Sep. 27, 2011, which claims the benefit of and priority from U.S. Provisional Patent Application No. 61/387,192, filed Sep. 28, 2010, the disclosure of which is hereby incorporated herein in its entirety.

FIELD OF THE INVENTION

This invention relates generally to construction of buildings, and more particularly relates to devices for the construction of wall panels and subassemblies thereof.

BACKGROUND OF THE INVENTION

Wall panels for the wall of a dwelling typically comprise a series of lumber boards arranged in a predetermined pattern and nailed together. Wall panel design varies from house to house because of consumer demand for individualized home design, although in some instances multiple wall panels for the same house will have the same arrangement. Most wall panels will include top and bottom horizontal boards and a number (often determined by a building code) of vertical boards to provide support. Often two or more vertical boards will be arranged in abutted fashion with the long axis of at least of one rotated 90° to form strengthened posts for corners and wall intersections. The horizontal and vertical boards are nailed together to form a panel. The panel is then installed in the dwelling at a desired time. Depending on the nature of the project, the panels may be fabricated on-site or remotely for subsequent transport and use.

Some wall panels include so-called "rough openings", which are openings within the frame of the panel for windows, doors and the like (see, e.g., FIGS. 1 and 2, which show a wall panel 15 that includes an opening 16 for a door, and a wall panel 20 that includes a rough opening 21 for a window). The numbers and sizes of boards around rough openings are often regulated by building codes. Also, the locations and sizes of rough openings can vary significantly based on the personal preferences of the homeowner or builder. As a result, automation of the wall panel fabrication process has been limited.

It may be desirable to provide an automated process by which wall panels, and in particular wall panels with rough openings, can be constructed in a more extemporaneous fashion with reduced setup and change-over time from panel-to-panel. Also, it may be desirable to provide a system that can construct wall panels of different heights and extended lengths.

SUMMARY OF THE INVENTION

As a first aspect, embodiments of the present invention are directed to a system for constructing wall panels comprising a plurality of structural members. The system comprises: a source of structural members of predetermined size; a horizontal table configured to support planks as they are being formed into a wall panel, the table including a stationary section and a movable carriage that is configured to move in a longitudinal direction toward and away from the stationary section; an articulated arm unit having a gripper, the articulating arm unit positioned to retrieve structural members from the source with the gripper and place them on the table; at least one first clamping unit mounted to the stationary section for clamping structural members thereto; at least one second clamping unit mounted to the movable carriage for clamping structural members thereto; and a controller that controls the movement of the articulating arm unit and the movable carriage. The presence of the movable carriage can enable the system to produce wall panels of almost any length.

As a second aspect, embodiments of the present invention are directed to a method of constructing a wall panel comprising a plurality of structural members. The method comprises the steps of: (a) providing a horizontal table configured to support planks as they are being formed into a wall panel, the table including a stationary section and a movable carriage that is configured to move in a longitudinal direction relative to the stationary section; wherein at least one first clamping unit is mounted to the stationary section for clamping structural members thereto; and at least one second clamping unit mounted to the movable carriage for clamping structural members thereto; (b) forming a subassembly of structural members, wherein at least one structural member is clamped with the first clamping units; (c) clamping the structural member with the second clamping unit; (d) releasing the first clamping units; and (e) moving the movable carriage relative to the stationary table section to move the subassembly relative to the stationary table section. This method can enable the construction of wall panels of almost any length.

As a third aspect, embodiments of the present invention are directed to a method of placing a structural member during the construction of a wall panel comprising a plurality of structural members. The method comprises the steps of: providing parallel first and second structural members extending in a longitudinal direction; placing, with an automated system, a third structural member between the first and second structural members, the third structural member being oriented at an oblique angle relative to the first and second structural members; and rotating, with the automated system, the third structural member to a position that is substantially perpendicular to the first and second structural members. This technique can enable or facilitate the automated placement of structural members in tight places that can be created due to the inconsistency of structural member dimensions and quality.

As a fourth aspect, embodiments of the present invention are directed to a method of constructing a wall panel comprising a plurality of structural members, the method comprising the steps of: with an automated system, positioning a first structural member on a build surface; with the automated system, positioning a second structural member on the build surface, the second structural member being in contact with the first structural member but not secured to the first structural member; and with the automated system, positioning a third structural member on the build surface, the third structural member being in contact with the second structural member, thereby using the second structural member as a positioning fixture. This technique can allow some structural members to be "self-fixturing" for other structural members, thereby simplifying the build process.

As a fifth aspect, embodiments of the present invention are directed to a method of determining the construction sequence of a wall panel comprising a plurality of structural members, comprising the steps of: (a) programmatically determining the dimensions of each structural member based on a data file; (b) programmatically determining structural member parameters; and (c) programmatically creating a nominal build sequence from the structural member parameters.

As a sixth aspect, embodiments of the present invention are directed to a method of programmatically and via automation constructing a wall panel comprising a plurality of structural members, the method comprising the steps of: (a) selecting a structural member for inclusion in the wall panel; (b) determining nailing requirements based on the structural member's use and location; (c) retrieving the structural member from a structural member source; (d) determining whether to move an already assembled subassembly relative to a build table based on the structural member's size, orientation, and/ or potential interference with another structural member or fixture; (e) moving the already assembled subassembly relative to the table if step (d) so determines; (f) positioning the structural member on the build table; (g) determining whether to attach the structural member to another structural member based on its position and/or use; (h) attaching the structural members if step (g) so determines; and (i) repeating steps (a)-(h) for additional structural members.

As a seventh aspect, embodiments of the present invention are directed to a method of constructing a wall panel comprising a plurality of structural members, comprising the steps of: (a) providing a horizontal table configured to support structural members as they are being formed into a wall panel, the table including a stationary section and a translation unit that is configured to move an already assembled subassembly relative to the stationary section; (b) forming a subassembly of structural members on the stationary section; (c) moving the subassembly relative to the stationary table section to a new position; and (d) adding additional structural members to the subassembly in its new position.

DETAILED DESCRIPTION OF EMBODIMENTS OF THE INVENTION

Figure 1:
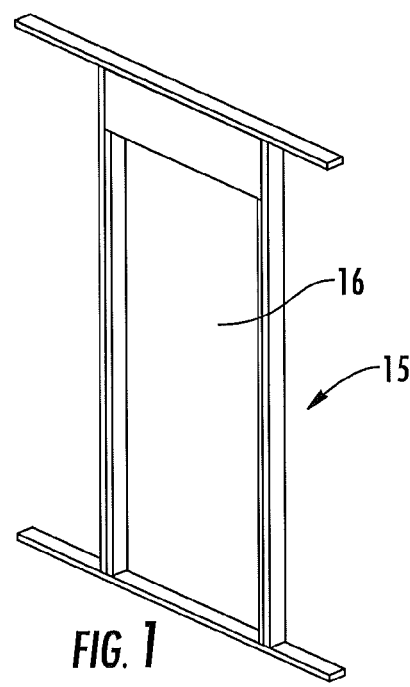
FIG. 1 is a perspective view of a wall panel with a rough opening for a door.
Figure 2:
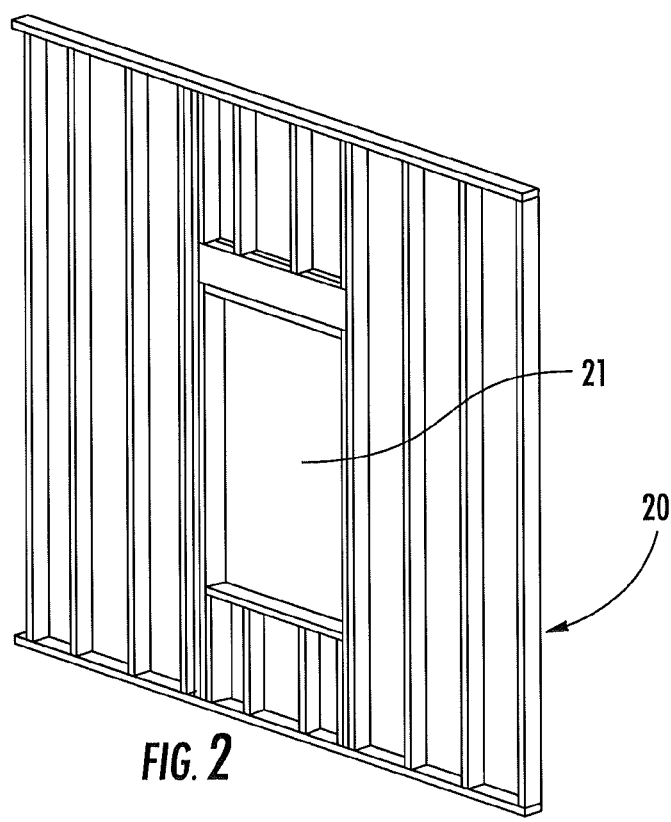
FIG. 2 is a perspective view of a wall panel with a rough opening for a window.

The present invention will be described more particularly hereinafter with reference to the accompanying drawings. The invention is not intended to be limited to the illustrated embodiments; rather, these embodiments are intended to fully and completely disclose the invention to those skilled in this art. In the drawings, like numbers refer to like elements throughout. Thicknesses and dimensions of some components may be exaggerated for clarity.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" or "above" the other elements or features. Thus, the exemplary term "under" can encompass both an orientation of over and under. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the expression "and/or" includes any and all combinations of one or more of the associated listed items.

Where used, the terms "attached", "connected", "interconnected", "contacting", "mounted" and the like can mean either direct or indirect attachment or contact between elements, unless stated otherwise.

Figure 3:
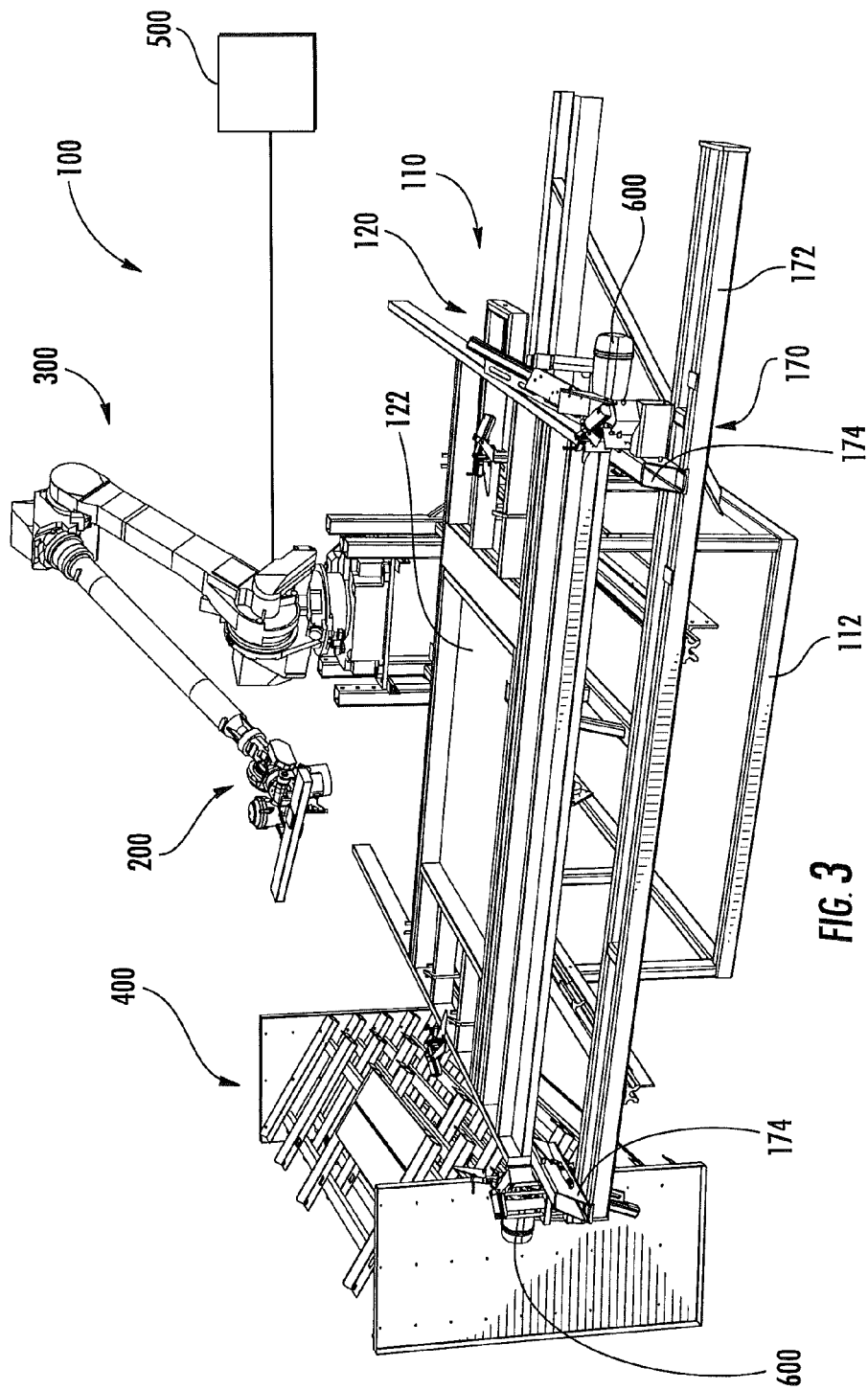
FIG. 3 is a perspective view of a wall panel construction system according to embodiments of the present invention.

Referring now to FIG. 3, a wall panel construction system, designated broadly at 100, is shown therein. The system 100 includes as general components a source of wall panel planks 400 (illustrated herein as a rack), an articulating arm unit 300 having a gripper/nailer 200, and a table 110. These are described in greater detail below.

As used herein, the term "longitudinal" and derivatives thereof mean the direction defined by a horizontal vector extending through the articulating arm unit 300 and the center of the table 110. The term "transverse" and derivatives thereof mean the horizontal direction perpendicular to the longitudinal direction (i.e., "across" the table 110). This direction is also synonymous with the "height" direction of a wall panel. The "depth" or "thickness" direction of a wall panel is synonymous with the vertical direction of the table 110.

As used herein, the term "wall panel" is intended to encompass wall panels employed in the walls of residential and commercial buildings that comprise a plurality of structural members (typically straight wooden boards or planks, although some wall panels include straight steel studs). Wooden boards are typically nailed together, but steel structural members may be attached with screws, crimping, welding, adhesives or the like. The term "wall panel" is also intended to encompass subassemblies for wall panels, such as rough openings for doors, windows and the like.

Table

The table 110 has two primary sections: a stationary section 120 and a movable carriage 170 that can be used as an additional build area and to pull or push (extrude, both positive and negative) wall sub-assemblies to appropriate lengthwise positions for assembly. Each of the stationary section 120 and the movable carriage 170 incorporates clamping and positioning elements to aid in the accurate positioning and securing on the boards. Some of these clamps serve a second purpose of holding wall sub-assemblies in a fixed position relative to the particular build section. These two components are described more fully below.

Stationary Section

A skeletal frame 112 supports the stationary section 120 from below. The stationary section 120 has one or more horizontal table surfaces 122 (see FIG. 3) mounted on the frame 112 in the work envelope of the articulating arm unit 300, although in some embodiments additional table surfaces may be employed. The table surfaces 122 receive work pieces (i.e., planks) from the articulated arm unit 300, which places the pieces in relative positions suitable for clamping and/or nailing. In this system 100, the table surfaces 122 need not be as large as the desired wall; its characteristic length (the distance from a point closest to the articulating arm unit 300 to a point furthest from the articulating arm unit 300) may be determined by various factors such as expected rough opening sizes or available space or articulated arm reach. The wall height dimension (in plane of the surface and perpendicular to the length direction) may be adjustable at either the top or bottom or both (top and bottom here referring to wall plate or plank locations) by adding surface extensions or moving subsections appropriate for the desired wall height (e.g., 8', 9' or 12').

The stationary section 120 may include fixed stops 124 to provide "zero" reference locations for boards and sub-assemblies. These stops 124 may be positioned at two or more of the table surface edges. These stops 124 can also be used to provide an opposing force when clamping a sub-assembly in the length or height directions. Alternatively, the lengthwise stops 124 may be incorporated in the "stud clamping" mechanisms described below.

Movable Carriage

Figure 10:
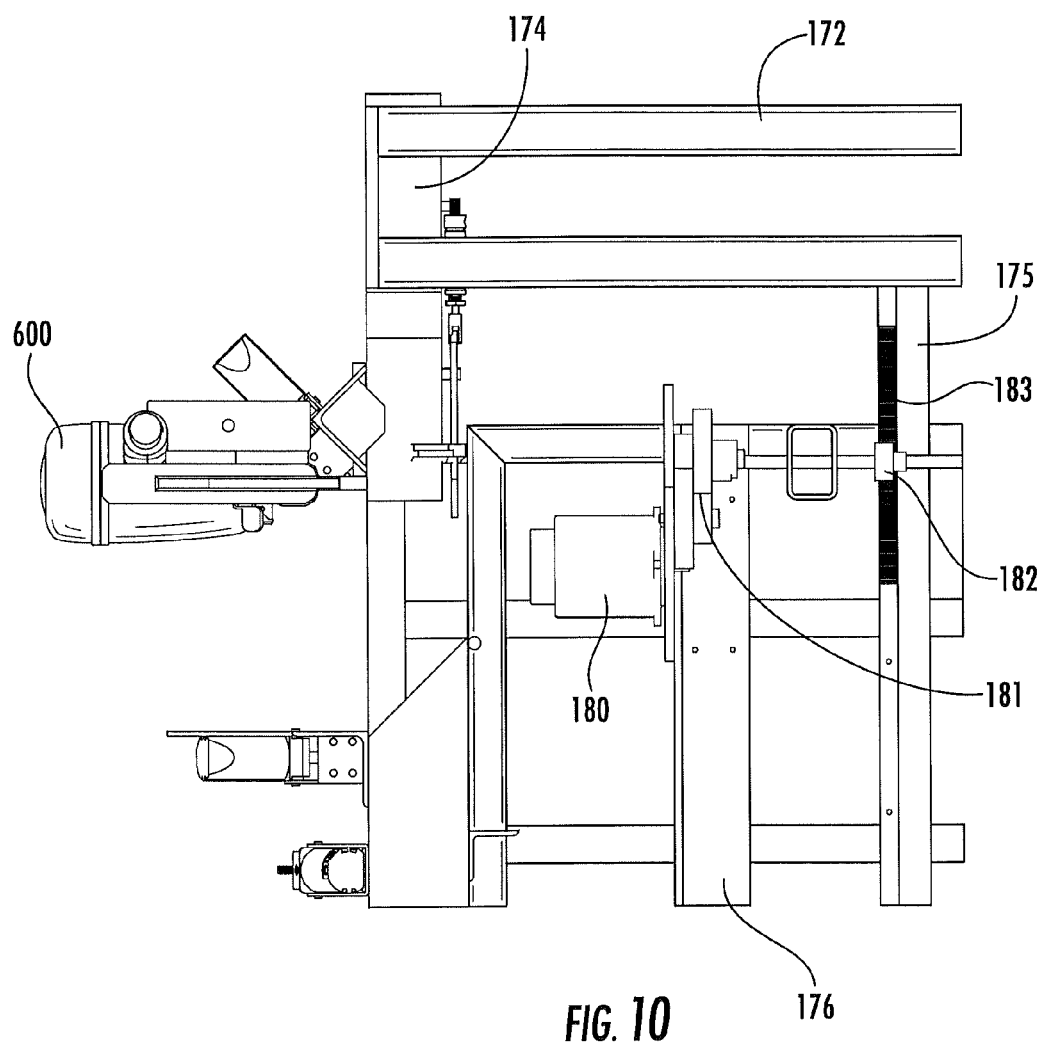
FIG. 10 is a bottom view of the system of FIG. 3 showing the movable carriage and its drive mechanism.
Figure 17:
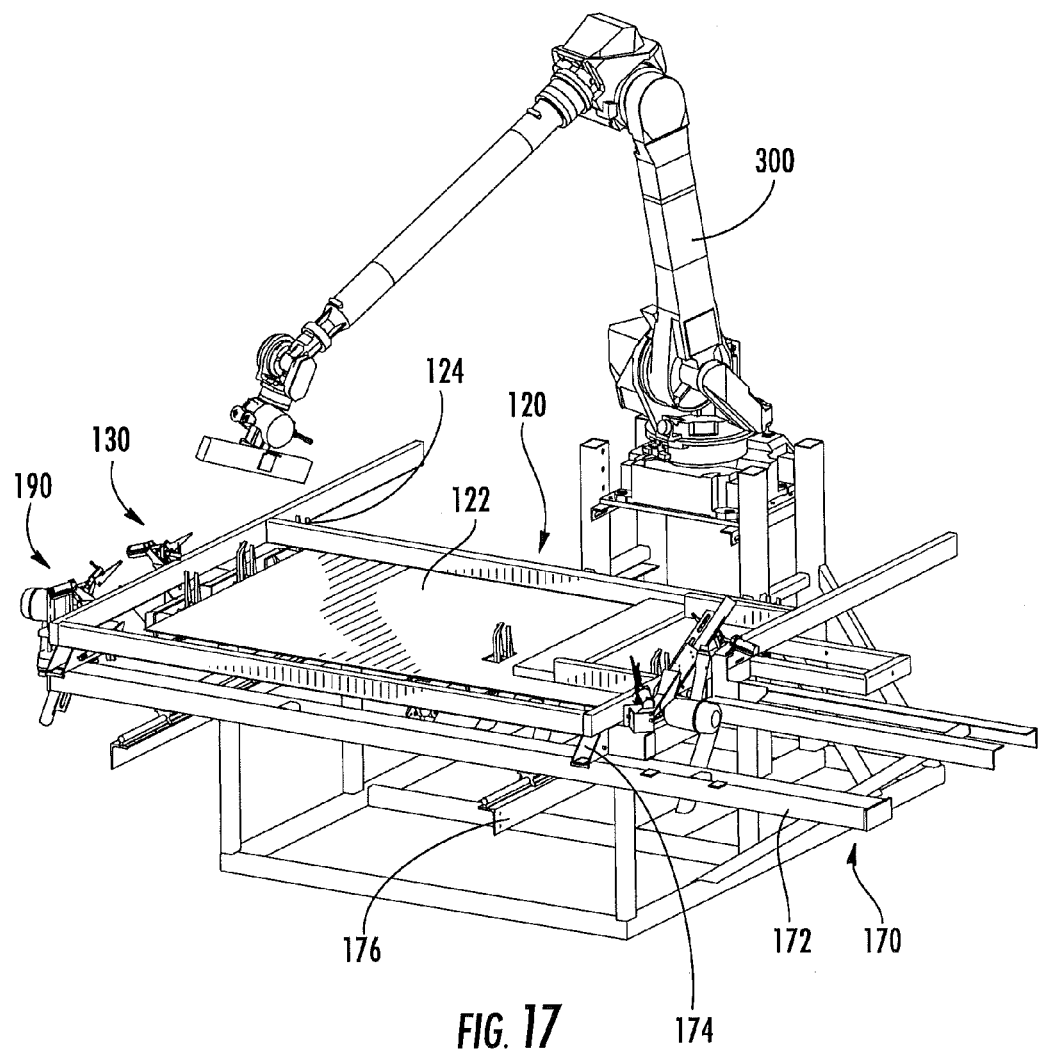
FIG. 17 is a perspective view of the system of FIG. 3.

Best seen in FIGS. 10 and 17, the movable carriage 170 includes cross-members 172 and rails 174 on a frame 175. The movable carriage 170 is mounted to the frame 112 on a pair of linear bearings 176 that allow motion along the length axis but constrain movement in the other axes as well as prevent rotation about any axis. Other means, such as wheels on tracks, may be used to achieve this constrained motion. In the illustrated embodiment, the motion is actuated by means of a servo-motor 180 mounted on the frame 112 and coupled to the movable carriage 170 by a transmission 181 and a pinion gear 182 that acts on a toothed rack 183. The allowable range of motion of the movable carriage 170 may vary from short distances such as 3' or less to long distances such as 16' or more. Thus, if the range is only 3' and a 5' translation is desired, the motion can be accomplished in an "inch-worm fashion" (described below) in two strokes of 2' and 3'.

Clamping Mechanisms

Figure 11A:
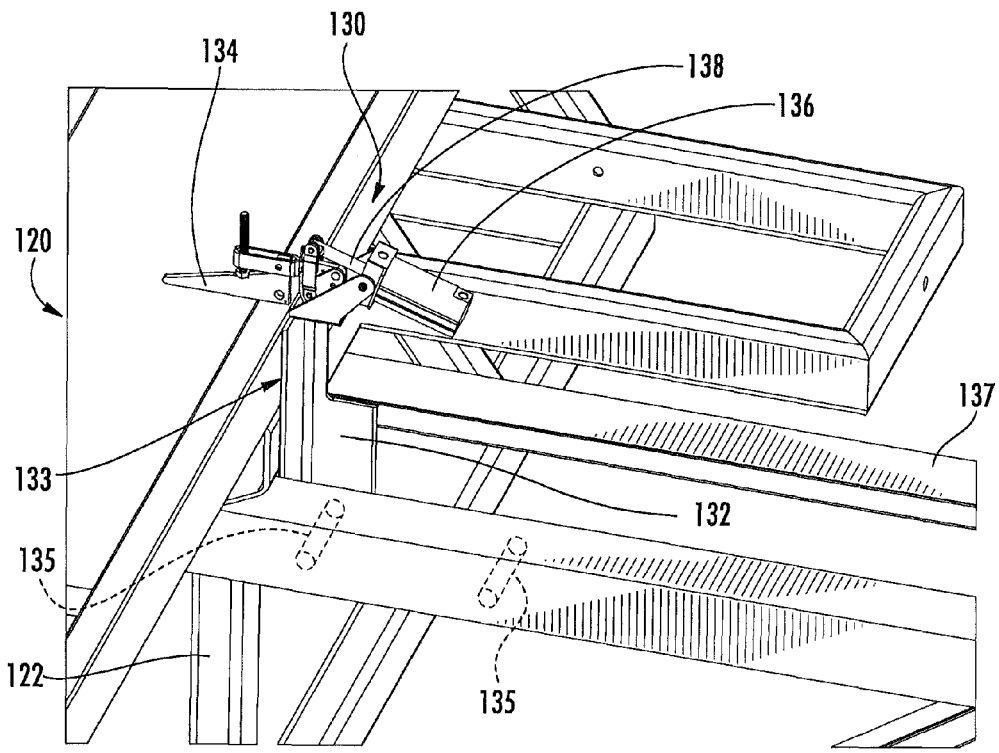
FIG. 11A is a perspective view of the top plank clamping unit of the system of FIG. 3 positioned for construction of a wall panel of a first height.
Figure 11B:
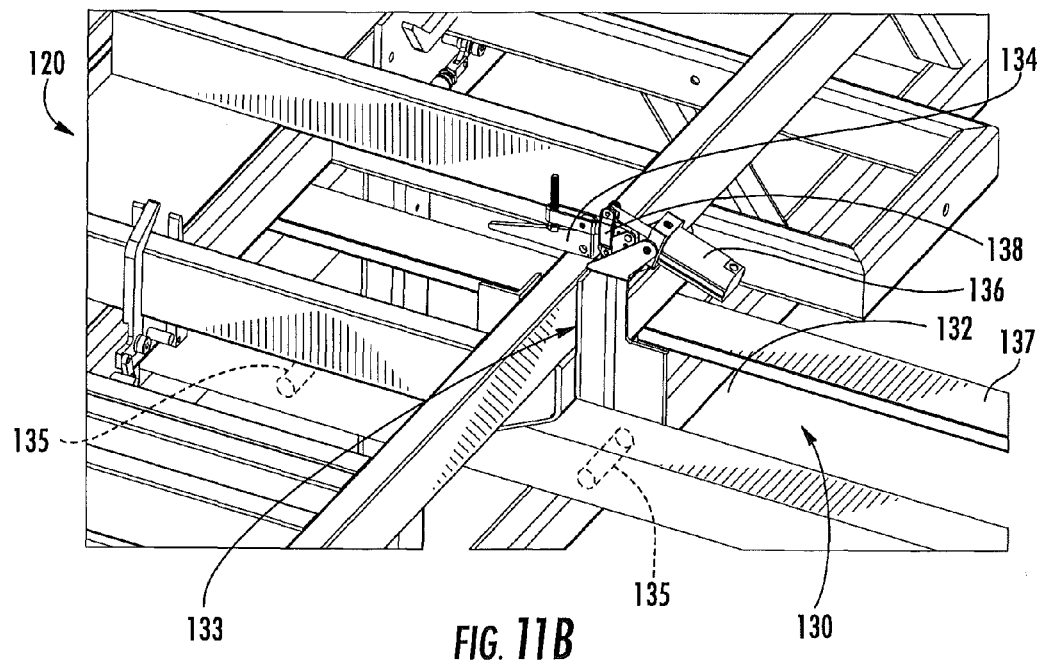
FIG. 11B is a perspective view of the top plank clamping unit of FIG. 11A positioned for construction of a wall panel of a second height.
Figure 12A:
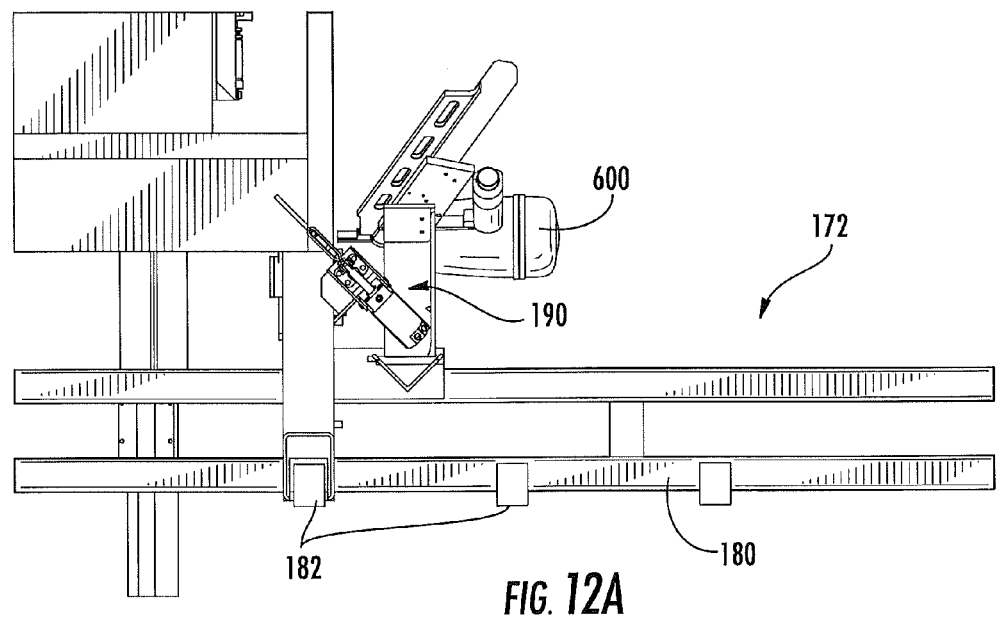
FIG. 12A is a top view of the movable carriage of the system of FIG. 3 showing the clamping unit thereof positioned for construction of a wall panel of a first height.
Figure 12B:
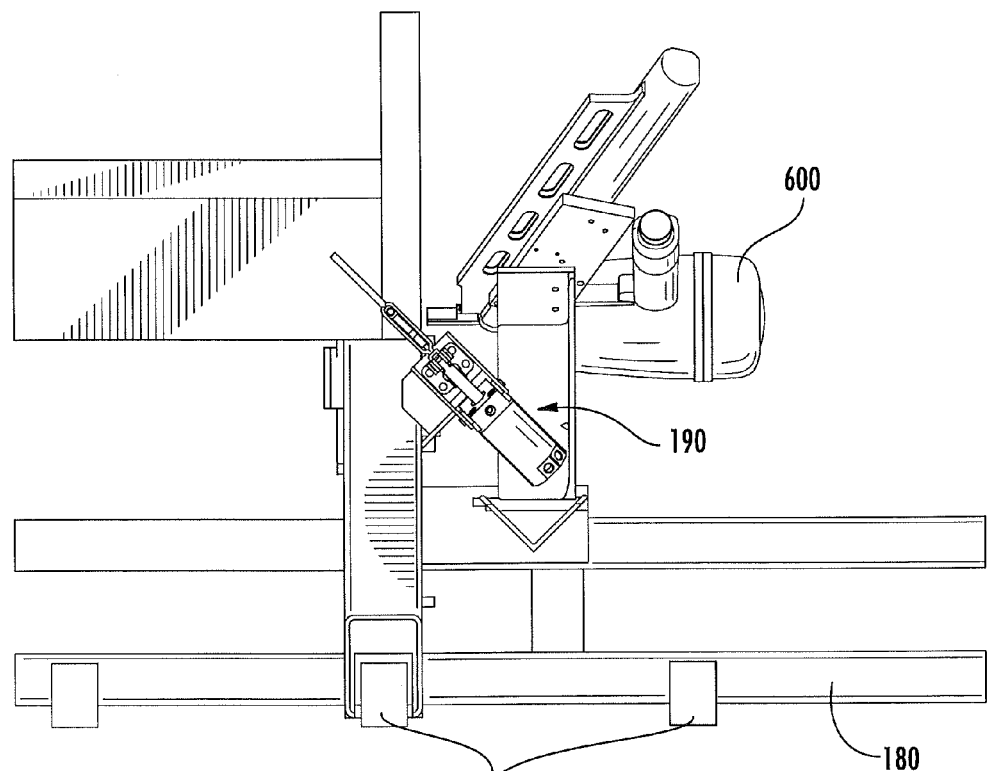
FIG. 12B is a top view of the movable carriage of FIG. 12B showing the clamping unit thereof positioned for construction of a wall panel of a second height.
Figure 13A:
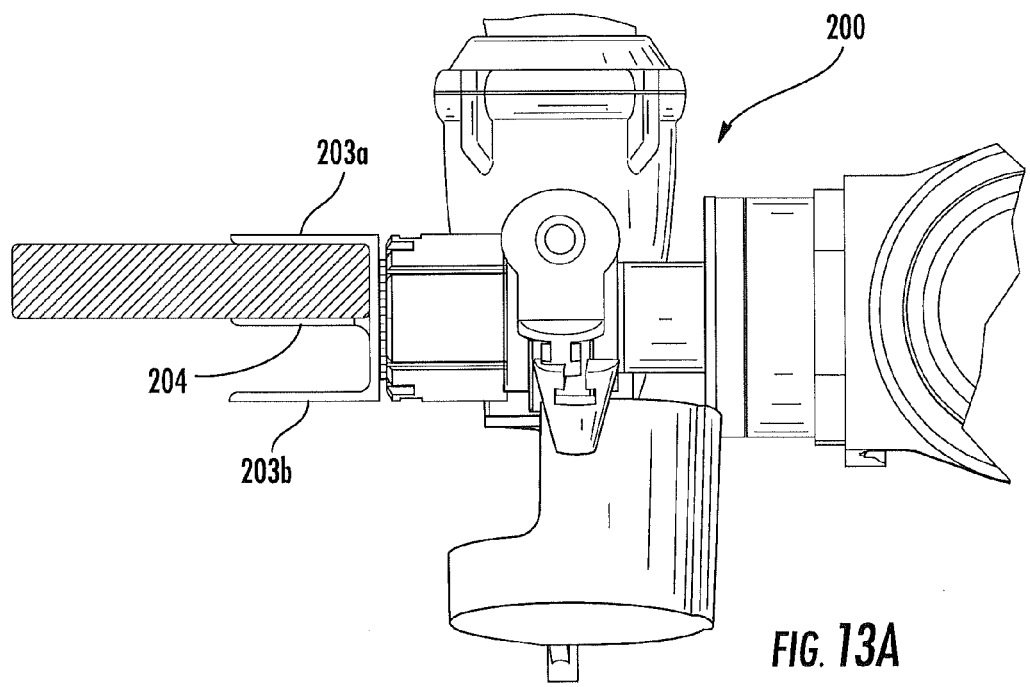
FIG. 13A is a side view of the nailer/gripper of the system of FIG. 3 showing the grasping of a 2-inch thick board.
Figure 13B:
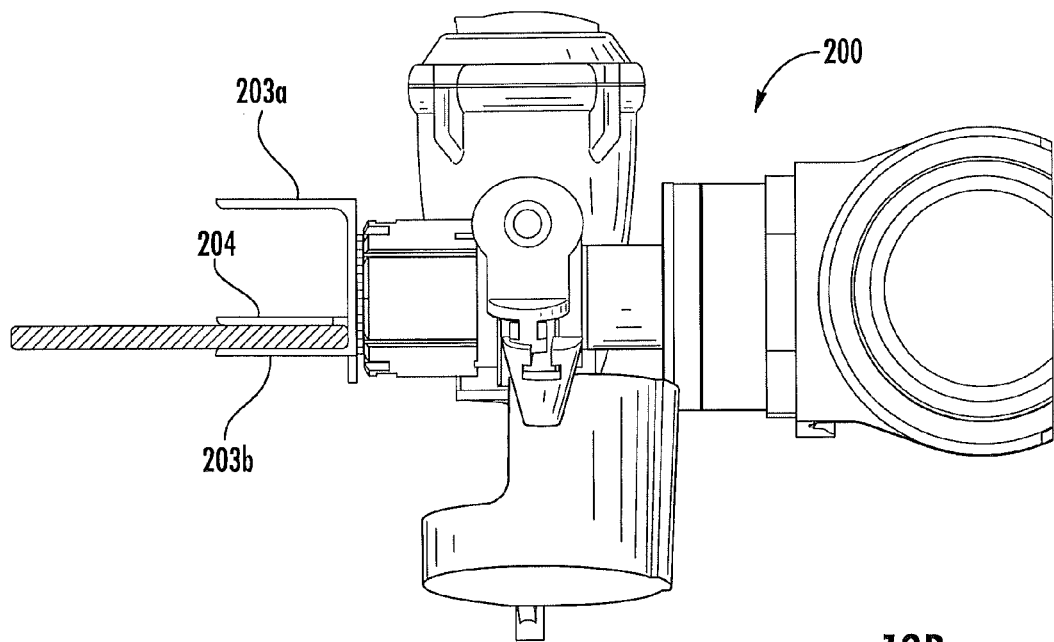
FIG. 13B is a side view of the nailer/gripper of FIG. 13A showing the grasping of a ½-inch thick board.

The table 110 includes a number of different varieties of clamping mechanisms. Top and bottom board clamp units 130 are mounted to the frame 112 (see FIGS. 11A and 11B). Each has a base 132 with a bearing surface 133 that faces the opposite side of the table 112. Thus, the top and bottom board clamp units 130 are mounted to provide a clamping force on the top and bottom planks of a wall panel being built in a direction along the height axis of the wall panel, and in doing so can capture boards (such as studs) positioned between the top and bottom planks. The top and bottom board clamp units 130 may be mounted to the stationary section 120 and/or frame 112 of the table 110 in such a way that they may be moved along the height axis to allow the construction of taller or shorter wall panels (see FIGS. 11A and 11B for different clamping positions). Adjustment for wall panel height may be achieved, for example, by including rails extending transversely from the stationary table section 120 with holes (shown at 135 in broken line in FIGS. 11A and 11B), that receive pins on the base 132 of the clamping units 130. The clamps 130 may act as against a rigid stop or it may be paired with an opposing clamp engaged with the opposing top or bottom plank.

Figure 4A:
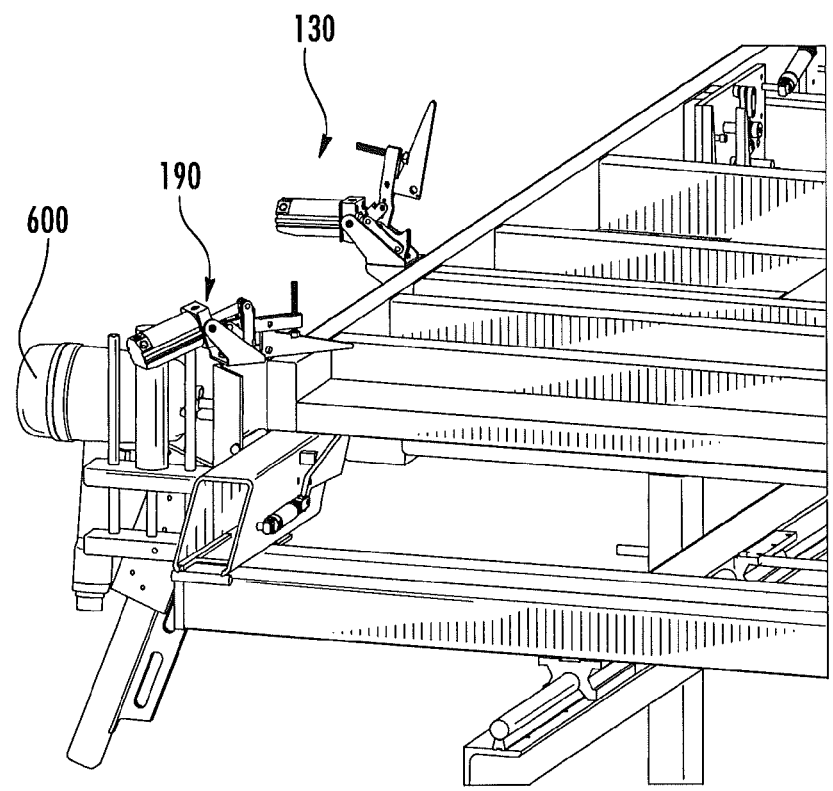
FIG. 4A is an enlarged perspective view of the system of FIG. 3 showing a bottom plank clamping unit in its released position and a clamping unit on the movable carriage of the table in its clamping position.
Figure 4B:
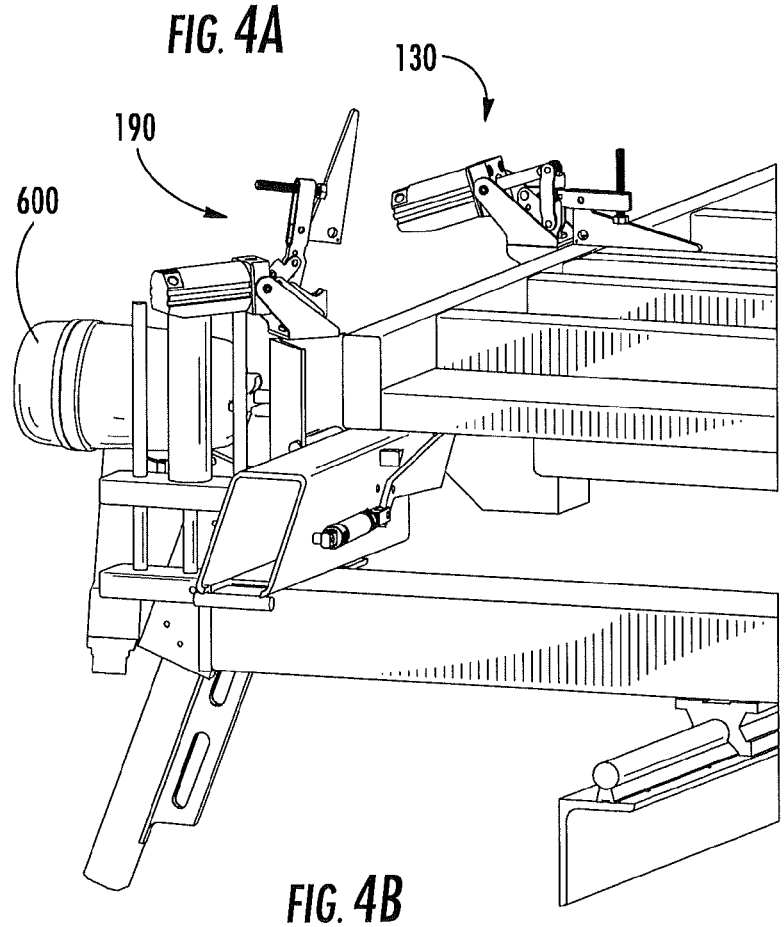
FIG. 4B is an enlarged perspective view of the clamping units of FIG. 4A with the bottom plank clamping unit in its clamping position and the clamping unit on the movable carriage of the table in its released position.
Figure 5:
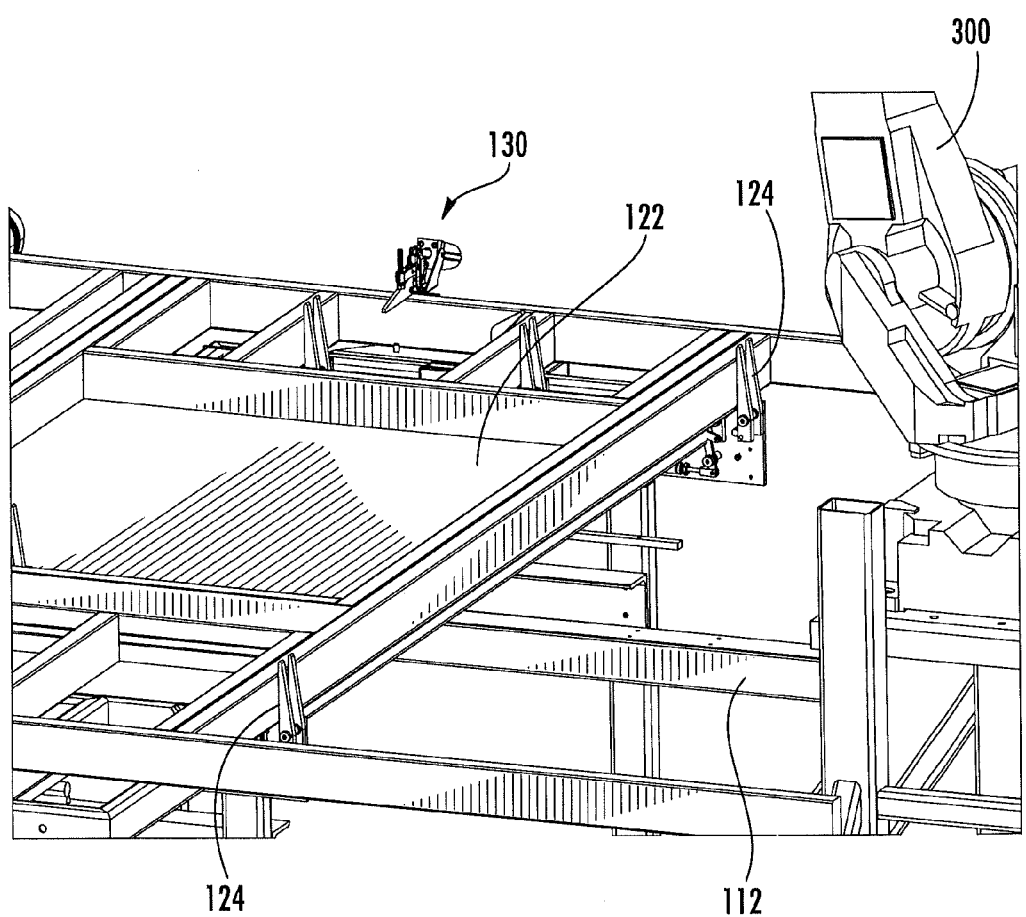
FIG. 5 is a reverse perspective view of the stationary table section and the top clamping unit of the system of FIG. 3.

The clamp units 130 also include a clamping member 134 that applies downward pressure on the upper surface of the top or bottom plank. The clamping member 134 is actuated between retracted and extended positions by a pneumatic cylinder 136 that acts through a linkage 138 attached to the clamping member 134 (see FIGS. 4A and 4B). The clamping unit 130 may be raised or lowered in height relative to the stationary section 120 (to address different wall panel depths) through any number of means, including pins, rods or other projections from the base 132 that are received in or engage the frame 112.

Figure 9A:
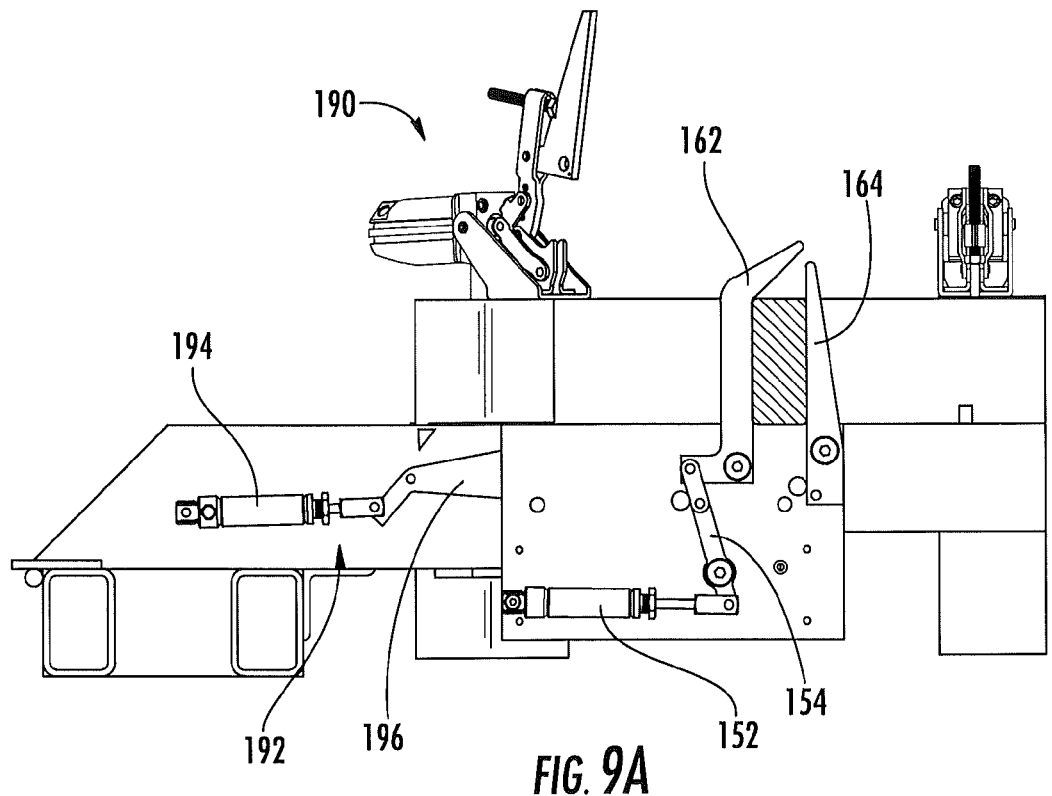
FIG. 9A is an internal side view of the system of FIG. 3 with the stud clamp extended and clamping a stud against a clamping member.
Figure 9B:
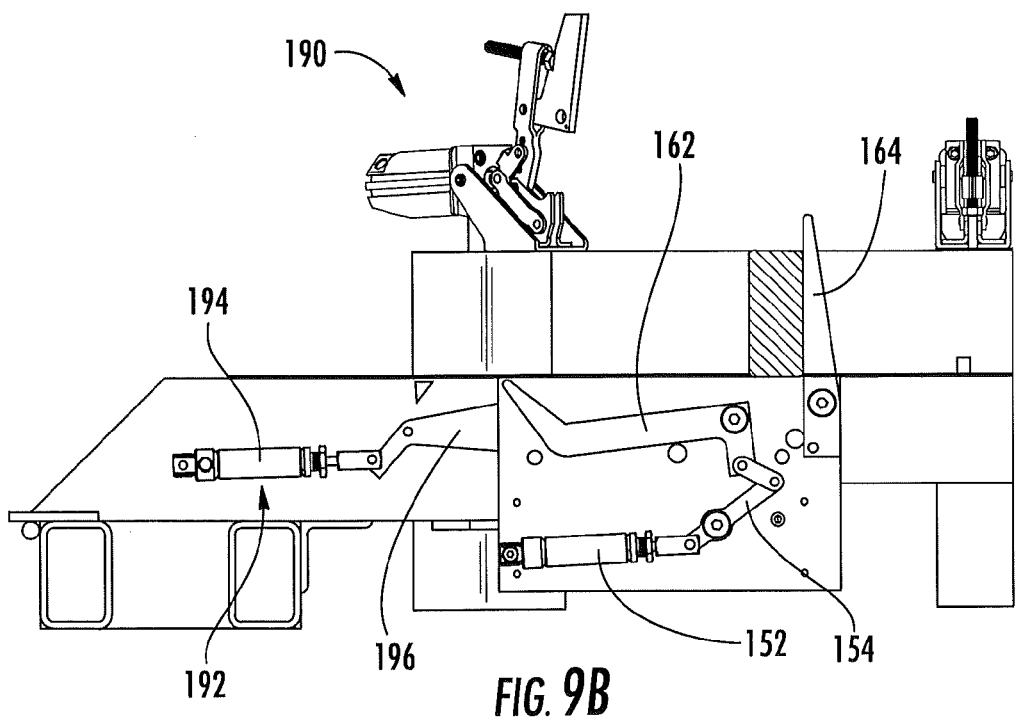
FIG. 9B is an internal side view of the system of FIG. 3 with the stud clamp retracted.

Referring now to FIGS. 9A and 9B, multiple stud clamping units 150 may also be included. The stud clamping units 150 include both active and passive clamping members. The active clamping member 162 is pivotally attached to the frame 112 below the table surface 122 and is can be actuated between extended and retracted positions via a pneumatic cylinder 152 and a retraction linkage 154. The passive clamping member 164 is also pivotally attached to the frame 112, but its motion is limited in one direction to an extended vertical disposition (its default orientation, which may be maintained by a spring or gravity counterbalance) but unlimited rotation in the opposite direction, thus allowing a fastened board to translate past the passive clamping member 164 without interference. The clamping position is nominally the thickness of the board to be clamped, thus holding it in an accurate position but not necessarily squeezing it tight. As a result, the board is held in its correct position and can be fastened permanently to another board by one of the several nail guns. Alternatively, the active clamping member 162 may be mounted on the movable carriage 170 and positioned by the movable carriage 170 to perform the clamping action at variable distances.

Like the top and bottom board clamping units 130, the stud clamping units 150 may be repositioned by a variety of means to locations appropriate for the desired wall height.

Variation in wall depth may be accommodated by modifying the depth dimension of the clamping member 162 to accommodate a depth of 4", 6", or 8".

Figure 14A:
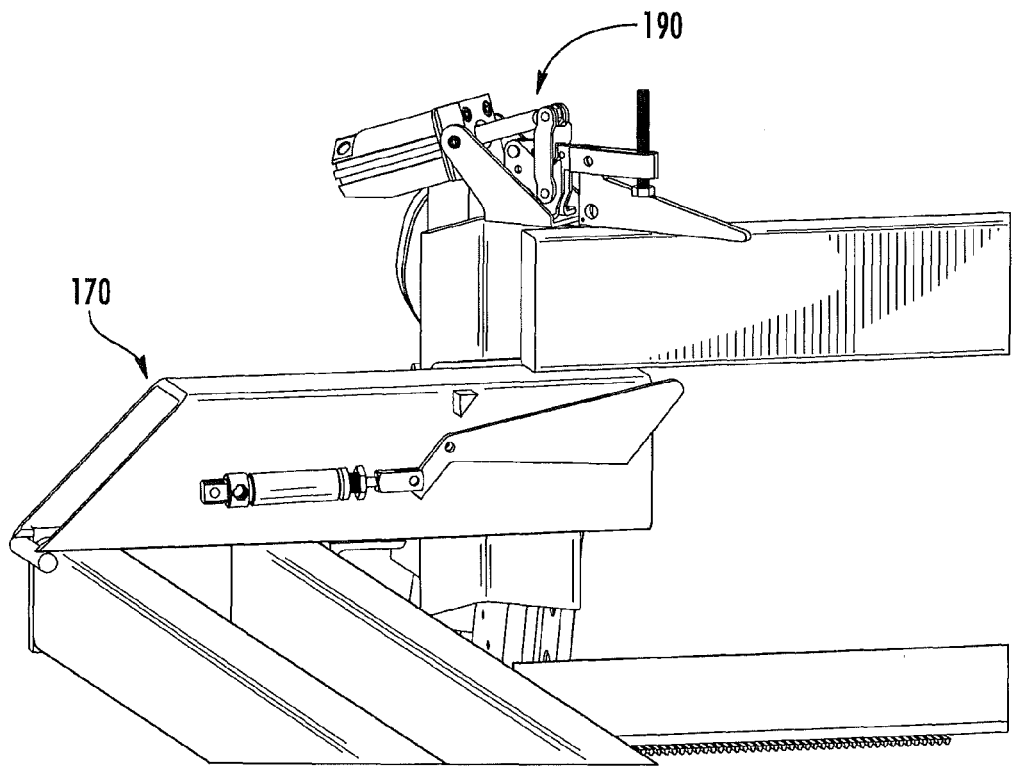
FIG. 14A is an internal perspective view of a clamping unit of the movable carriage of the system of FIG. 3 in position for construction of a wall panel of a first depth.
Figure 14B:
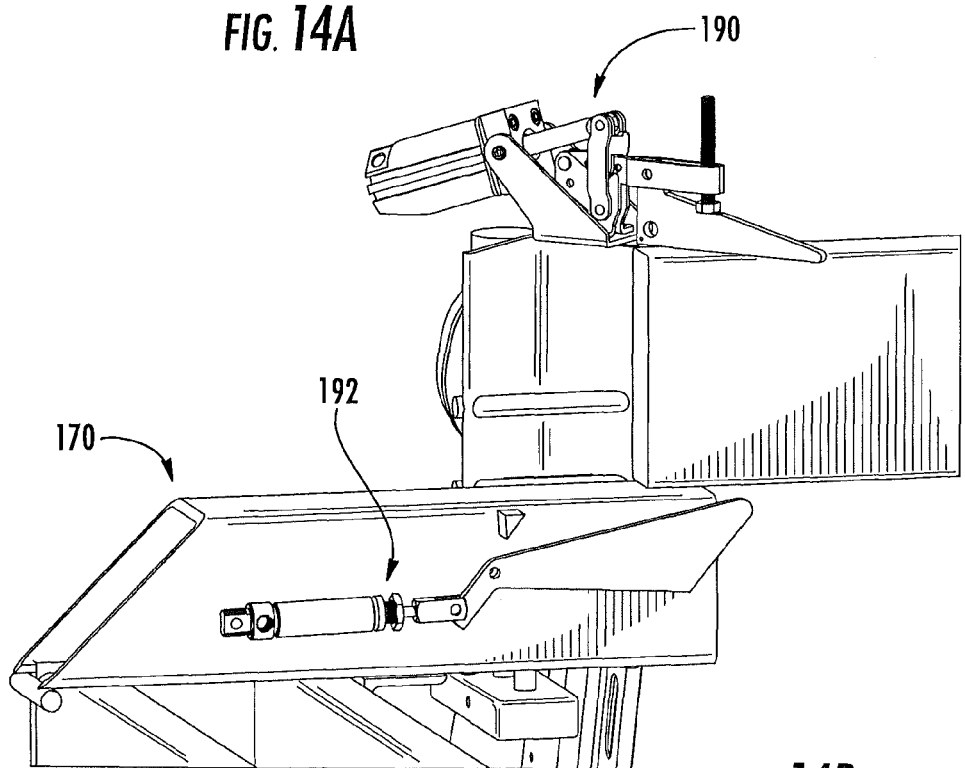
FIG. 14B is an internal perspective view of the clamping unit of FIG. 14A in position for construction of a wall panel of a second depth.
Figure 15:
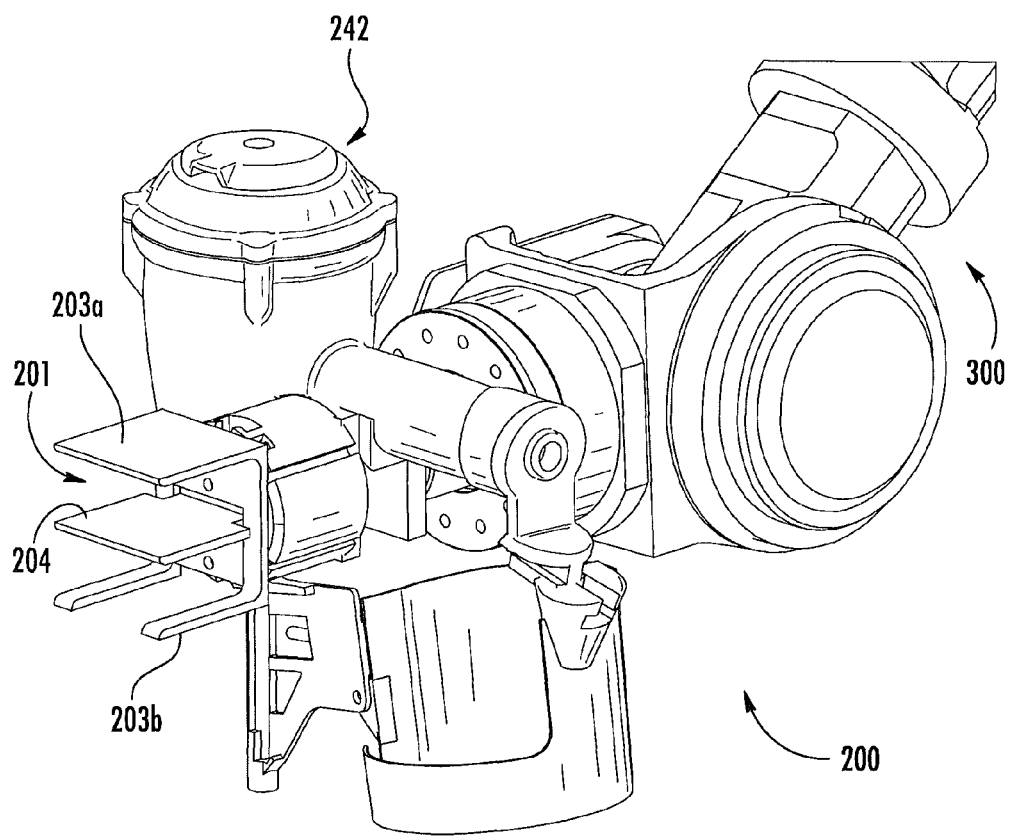
FIG. 15 is a perspective view of the nailer/gripper of the system of FIG. 3.

Referring now to FIGS. 4A, 4B, 9A, 9B, 12A and 12B, the movable carriage 170 includes a set of "puller" clamps 190 (acting in the depth direction) that are similar in construction to the top and bottom board clamps 130. The puller clamps 190 are positioned to engage at least the top and bottom boards of the wall panel. Like the clamping units 130, the puller clamps 190 can be mounted in different transverse positions on the movable carriage 170 to accommodate the construction of wall panels of different heights (see FIGS. 12A and 12B, which illustrate rails 180 on which the puller clamps 190 may be mounted, and posts 182 that can receive an opening in the base of the puller clamps 190). In some embodiments, the puller clamps 190 have the adjustable depth feature described above for the clamping units 130 (see FIGS. 14A and 14B for illustration of lowered and raised mounting positions of the puller clamps 190). By simultaneously actuating the clamps 190 and commanding motion of the servo-motor 180 (thereby causing the movable carriage 170 to move relative to the stationary section 120), the top and bottom planks (along with any boards secured thereto by nails) may be moved to a new position relative to the articulated arm 300. This position may be farther from or closer to the articulated arm unit 300. When the top and bottom planks are being moved, the clamping units 130 on the stationary section 120 of table 110 (acting in the depth direction) must be released to allow free movement of the boards.

Conversely, when the moveable section 170 must be moved relative to the wall panel, for instance to reset its position to perform the inch-worm translation described above, the state of the clamps 130, 190 is reversed, with the stationary section clamps 130 actuated to hold the wall in place and the moveable section clamps 190 released to allow unimpeded motion of the moveable section 170 relative to the wall panel.

Figure 8:
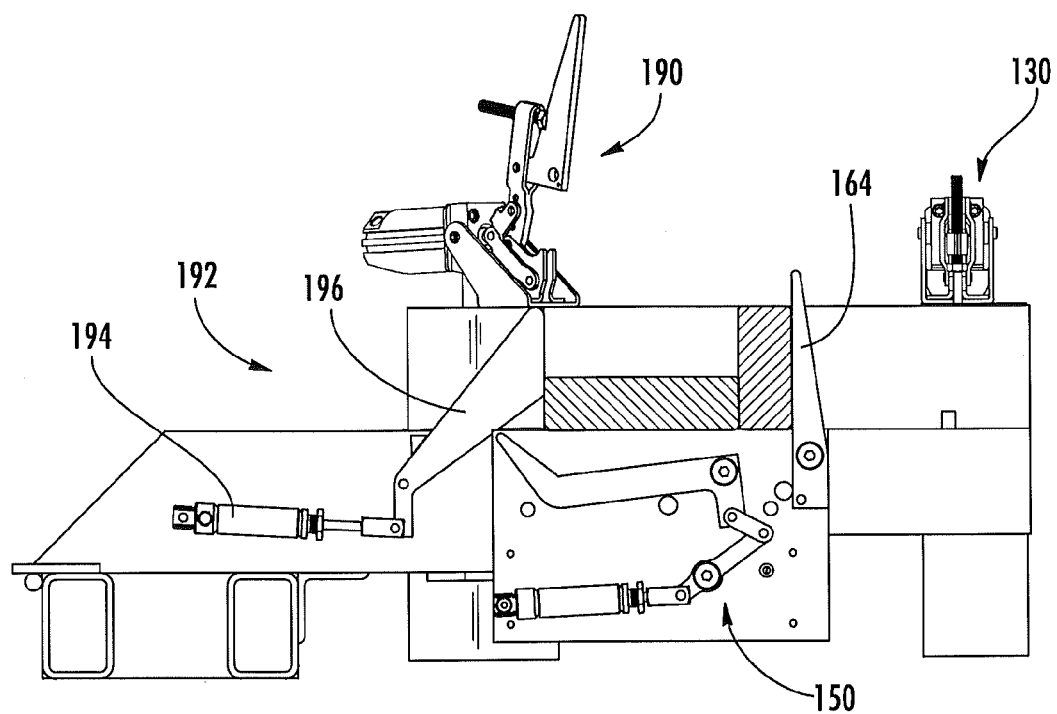
FIG. 8 is an internal side view of the system of FIG. 3 showing the stud clamping unit in a retracted position and the pusher clamp in an extended position.

Additionally, a set of "pusher" clamping units 192 (see FIGS. 8, 9A and 9B) may be disposed along the movable carriage 170 to provide a "pushing" action between the movable carriage 120 and the stationary section 120 (with opposing force provided by the fixed stops 124 of the stationary section 120). These pusher clamping units 192 are actuated via a pneumatic cylinder 194 to pivot between an extended position, in which a clamping member 196 extends upwardly above the table surface 122, and a clearance position, in which the clamping member 196 is retracted below the table surface 122.

Nailers

Nailers 600 (in this instance, nail guns) may be mounted to both the stationary section 120 and the movable carriage 170. A common use of these nailers 600 would be to fasten the top and bottom boards to studs and other boards such as headers and cripples. Thus, the nailers 600 on the stationary section 120 may be disposed at common on-center positions, such as 16" and 24", or in other positions as may be desired, or they may be mounted on a second motion base axis to be positioned on non-integral centers. Nailers 600 mounted to the movable carriage 170 may be positioned to non-integral on-center positions by translating the movable carriage 170 to an appropriate position using the servo-motor 180.

Figure 7A:
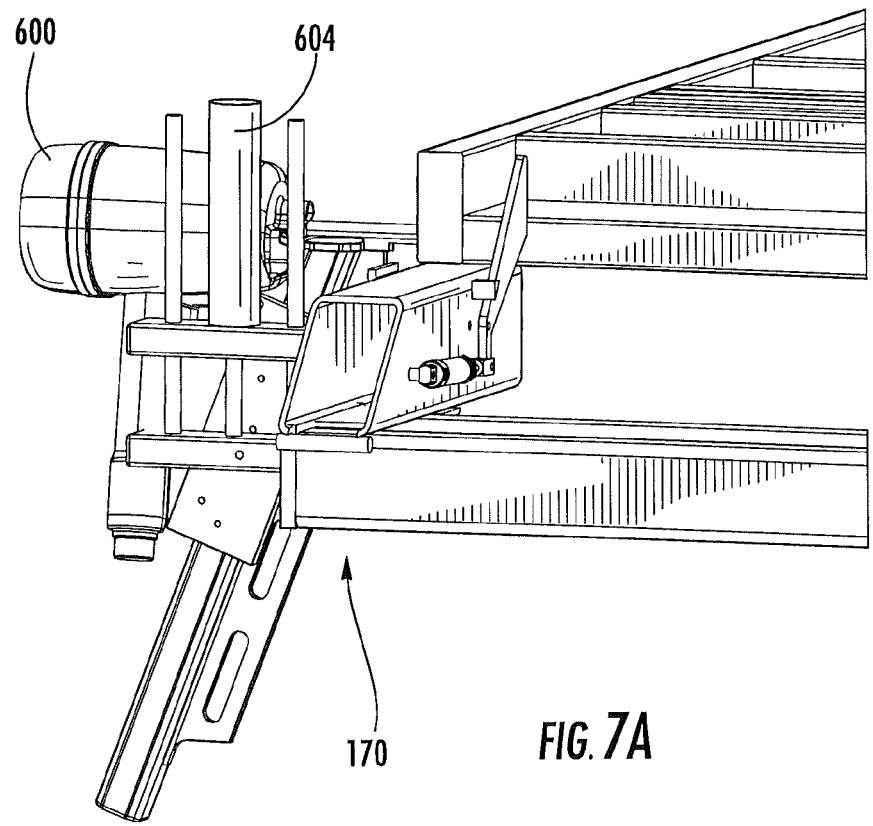
FIG. 7A is a perspective view of a nailing unit on the movable carriage of the system of FIG. 3 in a lowered position for nail insertion.
Figure 7B:
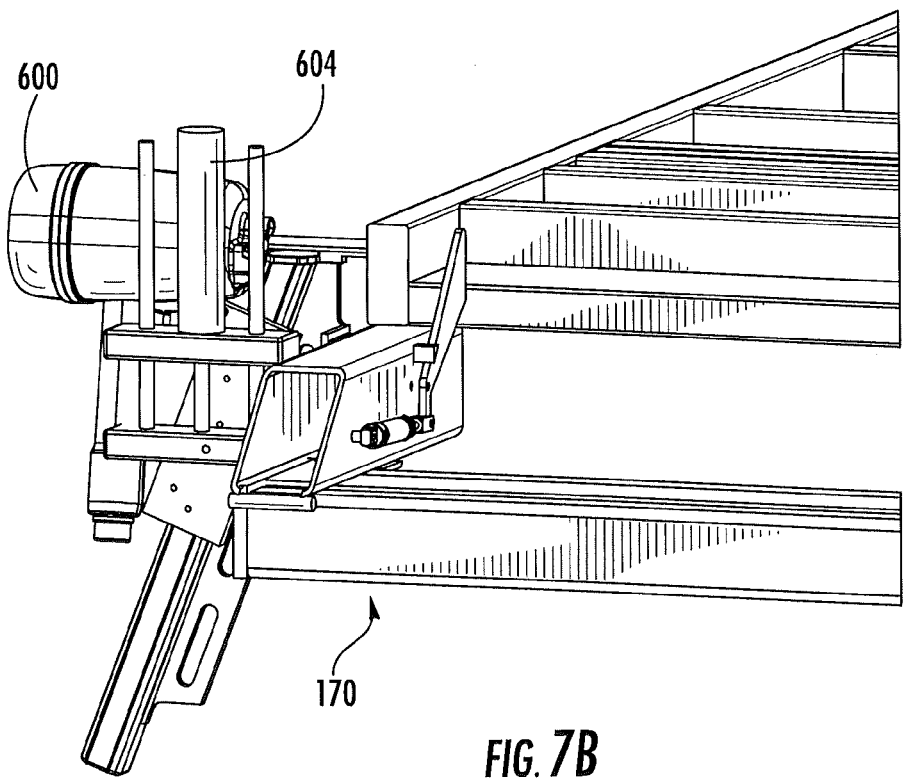
FIG. 7B is a perspective view of the nailing unit of FIG. 7A in a raised position for nail insertion.

To insert nails at multiple wall depth positions, the nailers 600 may be mounted on a mechanism that moves the nailer 600 on an axis parallel to the wall depth direction. This motion is achieved in the illustrated embodiment via a pneumatic actuator 604, but a servo-motor or other means may also be used (see FIGS. 7A and 7B).

Alternatively, nailing at additional depth positions may be accomplished with companion nailers: multiple (2, 3, or 4) companion nail guns may be mounted with a fixed vertical axis (wall depth), each a different height and the base axis may be moved to allow several nails to be shot into each stud/trimmer/cripple to plate connection position. This arrangement may have the advantage of speeding up the process and dividing the workload over more nailers.

As another alternative, nailers may be mounted on additional robotic manipulators to provide desired positioning for nailing.

To accommodate various wall panel heights, the plate nailers, pusher clamp, and puller clamp mechanisms may be repositioned by a variety of means to locations appropriate for the desired wall height. In this example the plate nailers, pusher clamp, and puller clamp for the top plate are mounted on a common support structure which is manually relocated during system setup along the height axis to the desired wall height such as 8' or 9' or 12'. One skilled in the art will recognize that this relocation could be implemented in a variety of ways including separate support structures and automation with actuators in the height direction.

Articulating Arm Unit

The articulating arm unit 300 is mounted on a base that is fixed relative to the frame 112. The articulating arm unit 300 is a largely conventional 6-axis robotic arm; an exemplary articulating arm unit 300 is described in detail in U.S. Patent Publication No. 2010/0057242, the disclosure of which is hereby incorporated herein in its entirety. Such a unit may be modified, particularly at the wrist member, to accommodate the gripper/nailer 200 described below. Other 6-axis articulating arm units may also be employed. Furthermore, the present invention is not limited to robots with fewer or more axes of motion, or to a single robot; multiple robotic arms for the movement of different tools may be employed.

Gripper/Nailer

Figure 6A:
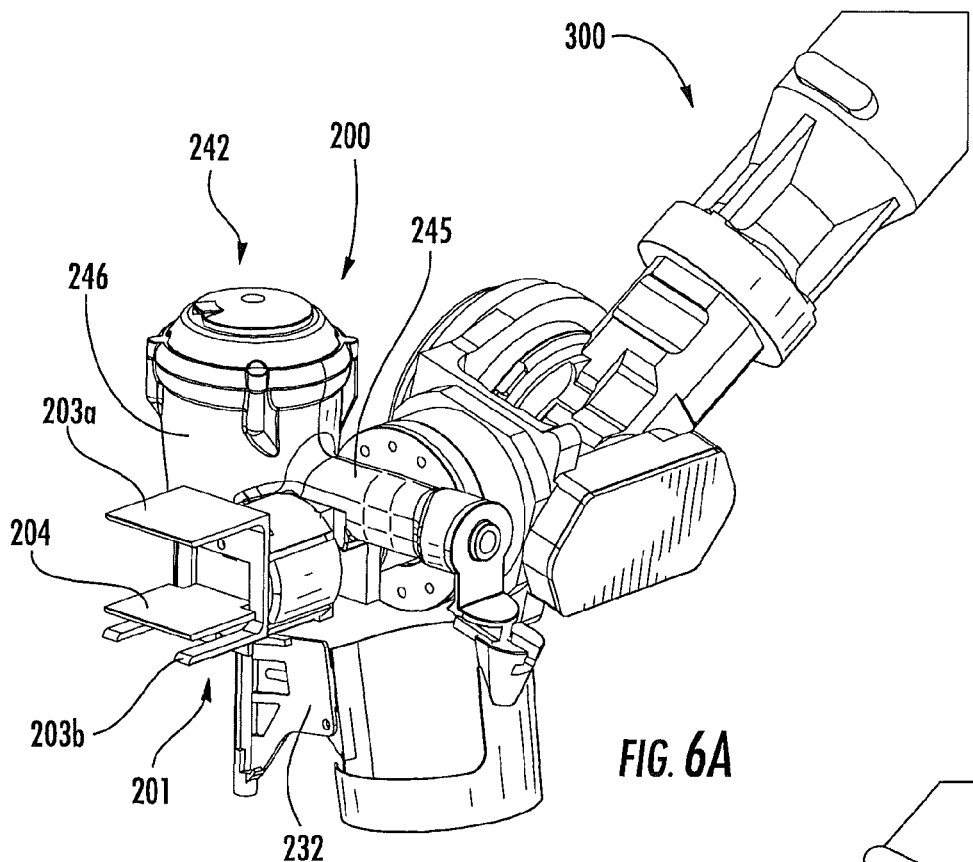
FIG. 6A is a perspective view of the nailer/gripper of the system of FIG. 3 without a plank in the gripper.
Figure 6B:
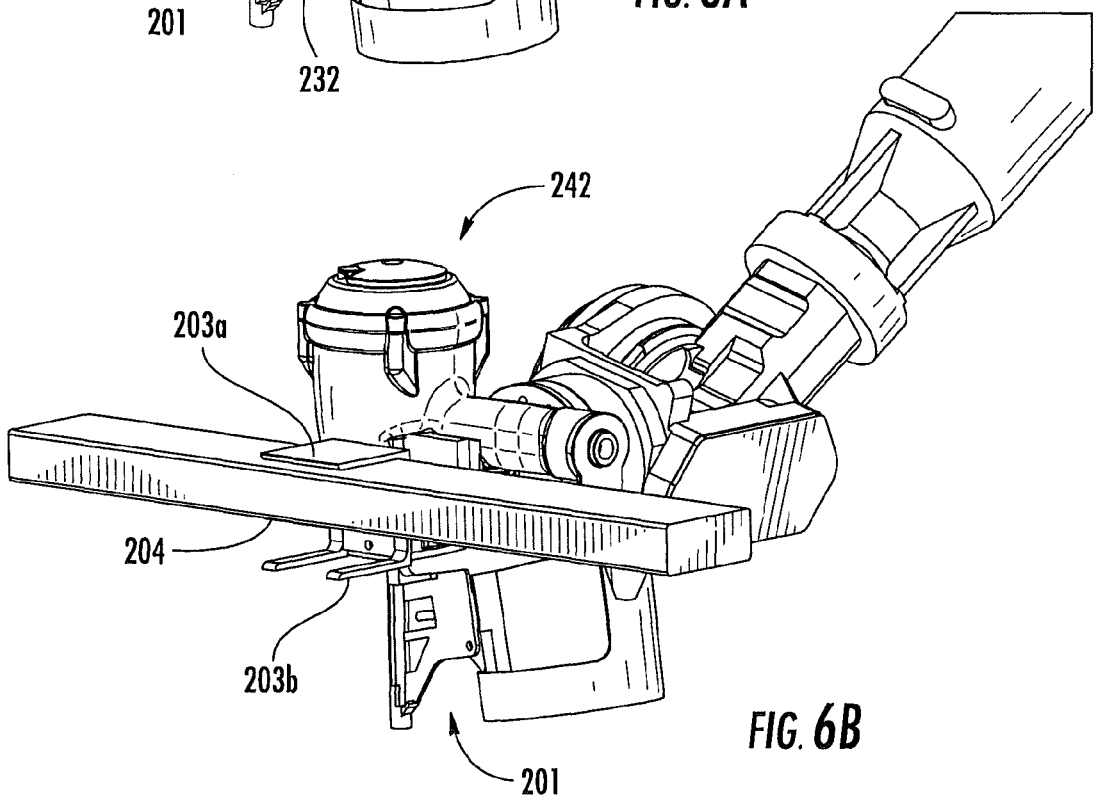
FIG. 6B is a perspective view of the nailer/gripper of FIG. 6A with a plank grasped by the gripper.

Turning now to FIGS. 6A and 6B, the gripper/nailer 200 is mounted onto the "wrist member" of the articulating arm unit 300. The gripper/nailer 200 has a gripper unit 201 that includes a frame 202 that includes two stationary fingers 203a, 203b and a movable finger 204 positioned between the stationary fingers 203a, 203b. The movable finger 204 is configured to move toward either of the stationary fingers 203a, 203b to clamp a board; in some embodiments, the movable finger 204 and the stationary fingers 203a, 203b are positioned so that the movable finger 204 and the stationary finger 203a can grasp a board of one thickness (e.g., 2 inches) and the stationary finger 204 and the movable finger 203b can grasp a board of a different thickness (e.g., 1 inch). The movable finger 204 is moved via a mechanism that relies on a pneumatic cylinder for actuation Those skilled in this art will appreciate that the gripper unit may take other configurations. For example, rather than pneumatic actuation, the gripping movement may be controlled mechanically, hydraulically, or electromagnetically. The shapes of the gripping fingers may vary, as may the shapes of the links causing the fingers to grip. In some embodiments, two or all three gripper fingers may move in the grasping motion. Other configurations will be apparent to those of skill in the art and need not be detailed herein.

Referring still to FIGS. 6A and 6B, a nailing unit 242 is also mounted onto the "wrist" member of the articulating arm. The nailing unit 242 includes a barrel 246, a magazine 232 attached to the barrel 246 and configured to supply nails sequentially to the barrel 246, and a handle 245 in which a trigger is incorporated. The trigger can be actuated by an electric solenoid, a pneumatic cylinder, or the like. The nailing unit 242 is mounted such that the barrel 246 extends in a direction that is generally away from the stationary grip fingers 203a, 203b, 204. This orientation can provide both the gripping unit 201 and the nailing unit 242 with sufficient space to operate without interference from the other unit.

An exemplary nailing unit is the DEWALT D51844 nailing gun, available from Black & Decker Corporation, Towson, Md. Other nailing units may also be employed. For example, the trigger may be actuated by other mechanisms, such as a mechanical piston or the like. Alternatively, the nailing unit may lack an external trigger, which can be replaced by a directing acting valve signaled by the controller 500. The nailing unit 242 may also be oriented differently relative to the gripper unit 201. The nailing unit 242 may even insert a different fastener, such as a staple; it is intended that the terms "nailing unit" and "nailer" encompass devices that insert other fasteners that penetrate boards in addition to nails.

In addition, those skilled in this art will recognize that other tools with additional functions may be included in the gripper/nailer 200. For example, many wall panels include holes for the passage of electrical, telephone, television, or computer wires or cables, or for water pipes, or HVAC conduits. The inclusion of a drill or a router on the gripper/nailer 200 would enable such holes to be formed automatically by the gripper/nailer 200 during the fabrication of the wall panel. Other tools (e.g., a sander, a staple gun, etc.) may also be attached to the gripper/nailer in some embodiments for the performance of other functions/tasks.

In addition, the mounting configuration may be modified to allow limited relative motion between the nailer and the gripper and/or the wrist. This motion may be supplemented with dampers and springs to absorb shock forces of the nailing action and thus improve the nailing function.

Additional aspects and features of a nailer/gripper are discussed in U.S. Patent Publication No. 2010/0057242, supra.

Board Rack

Referring to FIG. 3, the rack 400 is positioned adjacent the articulating arm unit 100 and the table 110. The rack 400 includes multiple shelves, trays, compartments or the like in which wooden boards of like size can be stored. The rack 400 is configured so that the gripper/nailer 200 can access any of the compartments in order to grasp boards contained therein. The rack 400 may take any number of configurations that enable the presentation of boards of a known size and in a known location to the gripper for placement on the table 110; in the illustrated embodiment, the boards are oriented generally horizontally, but in other embodiments vertical or other orientations may also be used. In some embodiments, the compartments may be adjustable in size to accommodate boards of different sizes/lengths. Also, in some embodiments, the rack 400 may be mounted to the frame 112 in order to maintain a predictable position relative to the articulating arm unit 300 and the table 110.

In some embodiments, the rack 400 may be associated with, or even replaced by, an automated "cut-to-length" saw that prepares boards or boards on demand. Such a saw may be connected to the controller 500, which directs the saw to cut a board to a specific length and present the freshly-cut board to the articulating arm unit 100 for retrieval and positioning on the work table 300. The use of a cut-to-length saw may reduce manpower requirements and eliminate the need for the rack 400.

In further embodiments, the rack 400, the table 110 and the articulating arm unit 300 may be mounted on a mobile vehicle, such as a truck, that can travel to a work site and construct walls on-site. Such an arrangement is illustrated and discussed in U.S. Patent Publication No. 2010/0057242, supra.

Software

Figure 19:
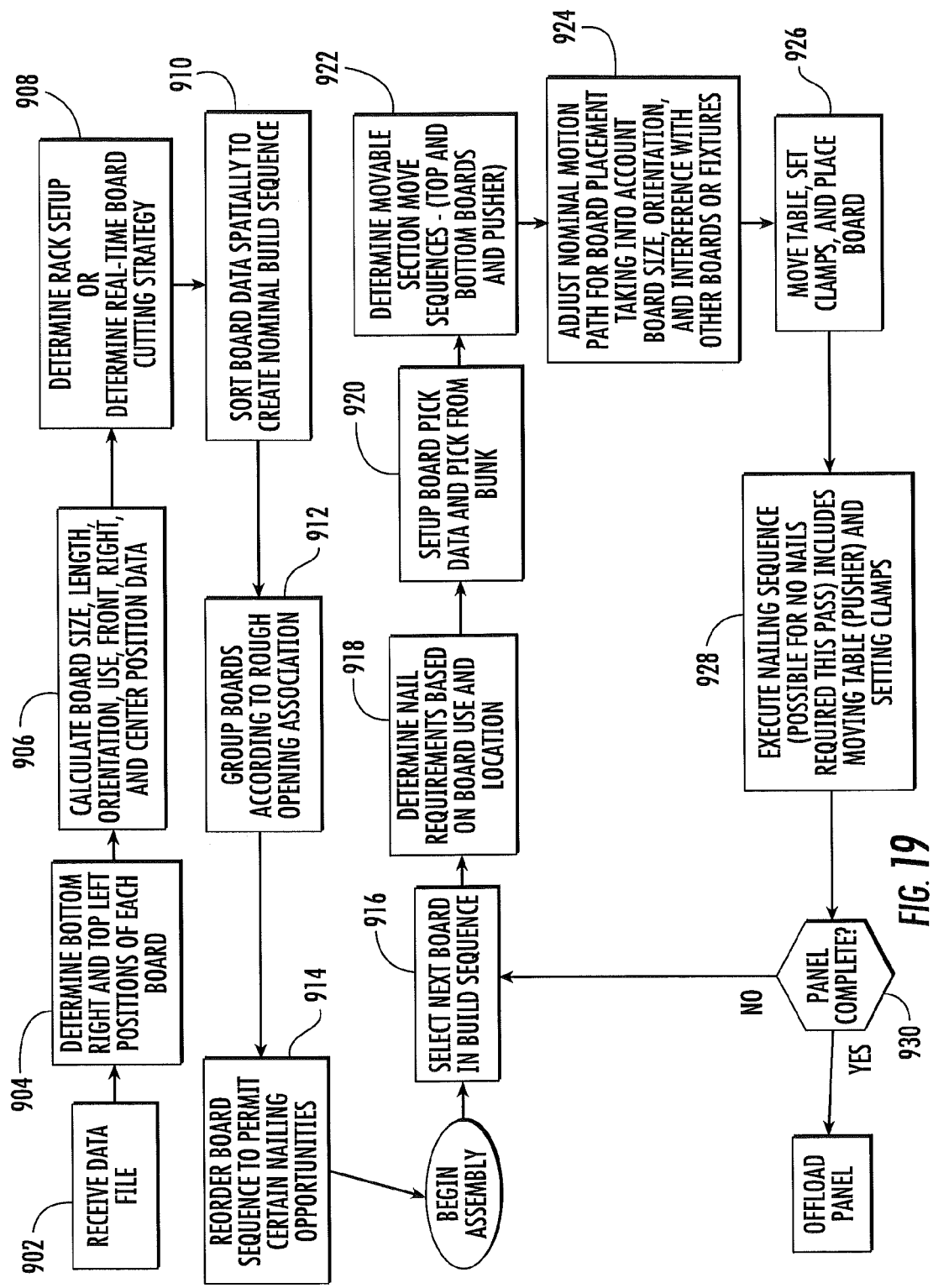
FIG. 19 is a flow chart illustrating operational process steps in accordance with embodiments of the present invention.

As illustrated in FIG. 19 and described in detail below under the Heading "Process", the software employed by the controller to operate the system is divided in two main parts. The first is a data preprocessor which receives a minimal data file (a simple list of Cartesian coordinate pairs, each pair representing a board) and analyzes it to determine more detailed board information. Nominal and refined build sequences (essentially a board pick and place order) as well as nail requirements can also be generated in this part. The second part involves guidance of the automation elements including the articulated arm 300, the various clamps, the nailers, and the movable table section 170. These main parts are described more completely below.

Software Part 1

Possible data file formats that sufficiently describe a board and its position could be either: 1) two diagonally opposite corners, or 2) one reference point such as a center and board dimensions. Some of the details provided by the pre-processor can be board type and use (e.g., 2×4, 2×8, stud, header), and rough opening association as well as others. Part supply set-up can also be accomplished in this part since a constant supply of ready board is needed for efficient operation of the system. This part set-up may involve allocating storage locations on the rack 400 with a known pattern, or it may involve determining a cut sequence for an automated saw including raw material input, finished board presentation and scrap disposition.

Software Part 2

With basic panel requirements established in Part 1, actual execution of the build task must be accomplished. Since robots are typically programmed to accomplish a fixed process cycle over and over, a special software architecture is required to accomplish the infinitely variable process cycles required for wall panels. In this implementation two subdivisions of code for Part 2 are used. The subdivision may be implemented, for instance, as a first section of code written and executed in the Fanuc Robotics "KAREL" language and a second section written and executed in the Fanuc Robotics "Teach Pendant" language, although other languages may be used.

The first subdivision is a generalized loop that executes pick, place and nail actions based on the board sequence determined in Part 1. Steps in this subdivision include determining nail requirements based on board use and location, determining the rack pick location, picking the board, determining positioning requirements for the moveable table section, adjusting nominal motion path taking into account board size, orientation, and collision avoidance for placed boards and fixtures.

The articulated arm may be controlled by subroutines for general motion paths which may run as separate processes. These general motion paths can include both static motion waypoints as well as programmable motion waypoints and target points which may be changed by updating "offset positions." (An exemplary target point would be the desired location of the board on the build table.) Offset positions can be loaded to the motion path routines in a routine based on the requirements established in the motion planning steps above. (Offset positions may take the form of 6 degree-of-freedom positions relative to a fixed frame of reference or relative to another position established in one of several frames of reference such as the main table reference frame or a nail gun reference frame.)

Before and after boards are placed, moveable table section and clamps may be actuated according to the particular requirements of that cycle.

Next, a nailing sequence may be executed. Some nails may be shot using the end-of-arm nail gun. As with the pick and place routines, this may be accomplished using general routines with waypoints and target points established using offsets. Other nails may be shot by any of the table mounted nailers. This step may also include actuating clamps and the pusher mounted on the moveable table section to closely align the boards to be joined before shooting the nail. It is also possible that no nails would be shot during a particular cycle or that only one or the other of the arm-mounted or table-mounted nailers would be used.

This process is repeated until all boards required by the wall panel have been placed and secured with fasteners. One skilled in the art will recognize that other divisions of steps and code as well as sequence of steps could be used, such as combining the generic motion instruction routines into the build sequence routines.

Other Software Considerations

Data processing systems, methods, and computer program products in accordance with embodiments of the present invention may be incorporated in a programmable logic controller and/or digital signal processor in communication with a Human Machine Interface (HMI). The processor communicates with the memory via an address/data bus. The processor can be any commercially available or custom microprocessor. The memory is representative of the overall hierarchy of memory devices containing the software and data used to implement the functionality of the data processing system. The memory can include, but is not limited to, the following types of devices: cache, ROM, PROM, EPROM, EEPROM, flash memory, SRAM, and DRAM.

As will be appreciated by those of skill in the art, the operating system may be any operating system suitable for use with a data processing system, such as OS/2, AIX, DOS, OS/390 or System390 from International Business Machines Corporation, Armonk, N.Y., Windows CE, Windows NT, Windows98, Windows2000, Windows XP or Windows 7 from Microsoft Corporation, Redmond, Wash., Unix or Linux or FreeBSD, Palm OS from Palm, Inc., Mac OS from Apple Computer, LabView, or proprietary operating systems. Particularly suitable is the operating environment "Handing Tool", available from Fanuc Corporation, which can process commands in the KAREL and TEACH PENDANT languages. I/O device drivers typically include software routines accessed through the operating system by application programs to communicate with devices such as I/O data port(s), the articulating arm unit, data storage and certain memory components. Application programs can implement the various features of the data processing system and can include at least one application, which supports operations according to embodiments of the present invention. Finally, as used herein "data" represents the static and dynamic data used by the application programs, the operating system, the I/O device drivers, and other software programs that may reside in the memory.

While the present invention is illustrated, for example, with reference to particular divisions of programs, functions and memories, the present invention should not be construed as limited to such logical divisions. Thus, the present invention is intended to encompass any configuration capable of carrying out the operations described herein. As used herein, the term "programmatically" refers to operations directed and/or primarily carried out electronically by computer program modules, code and instructions.

Operations

As an overview, in constructing a wall panel, the system 100 serially selects boards from the rack 400 with the articulating arm unit 300, carries them to a position on the table 112 (either the stationary section 120 or the movable carriage 170), orients the boards, and releases them. At predetermined times, either the nailer 200 of the articulating arm unit 300 or one or more of the nailers 600 fires nails into two or more boards to form joints. The activity of the system is controlled by the controller 500.

More specifically, the controller 500 signals the articulating arm unit 300 to move the gripper unit 201 to the vicinity of an appropriately sized board. The controller 500 signals the movable finger 204 to grasp the board against the appropriate stationary finger 203*a*, 203*b*, then signals the articulating arm unit 300 to move the grasped board to the desired position on the table 112 in the desired orientation. The controller 500 then signals the movable finger 204 to move to release the board in the proper position. The controller 500 then signals the articulating arm unit 300 to withdraw and move to its next task.

When nailing of boards within the wall panel (i.e. interior to the top and bottom planks) is called for, the controller 500 moves the articulating arm unit 300 to position the nailing unit 240 at a desired location and orientation, then signals the nailing unit 240 to insert a nail.

In addition to the general pick and place and nailing tasks described above, there are a number of different specific tasks that the controller may call for during the construction of a wall panel. Some of these tasks are discussed in detail below.

Placement of a Board Perpendicular to Two Boards

Figure 21A:
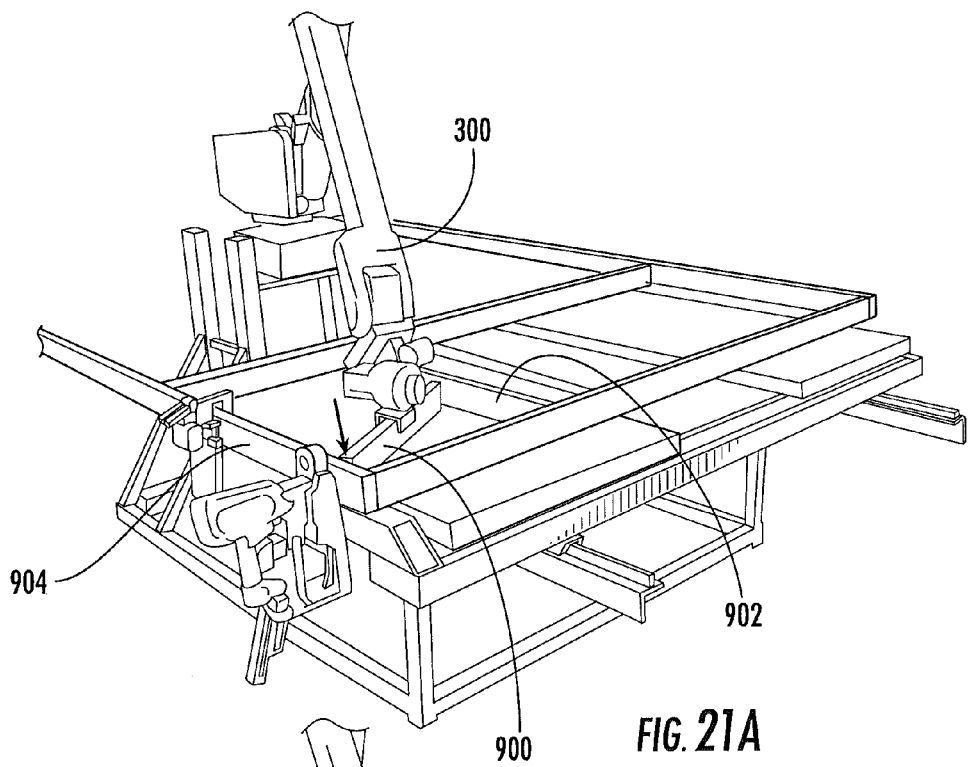
FIGS. 21A and 21B are perspective views of the system of FIG. 3 illustrating how a board may be rotated into place between two boards already in position.
Figure 21B:
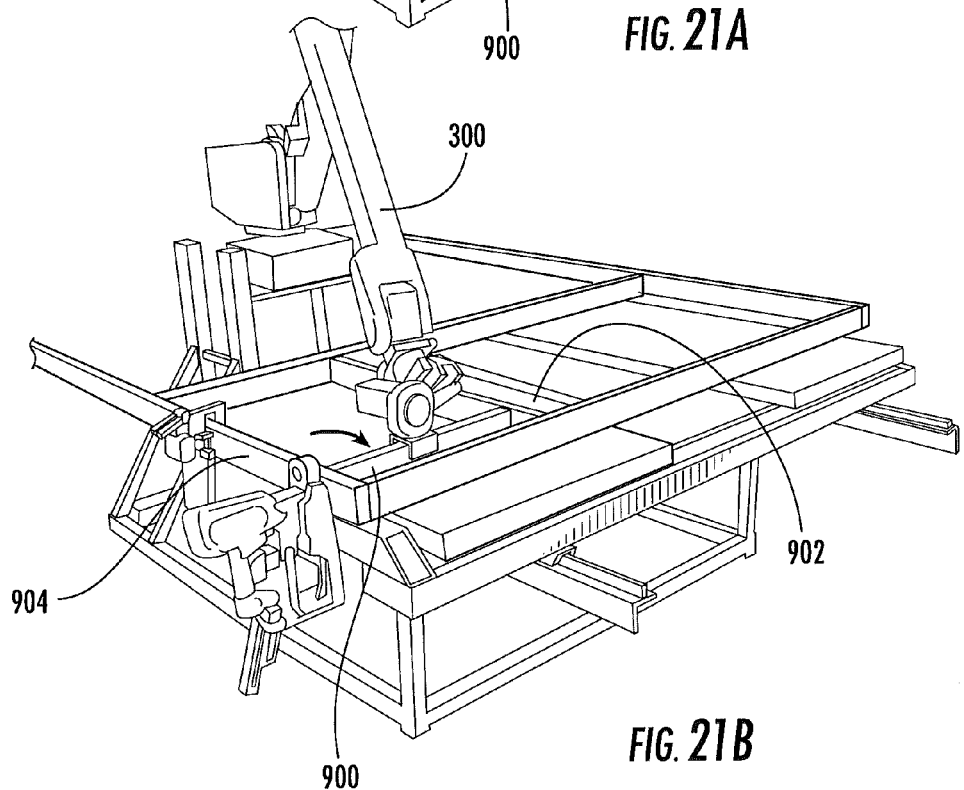

In some instances, the board to be placed is to span perpendicularly two parallel boards that are already clamped or otherwise secured in position. In such an instance, instead of immediately placing the board perpendicular to the two original boards, the articulating arm unit 300 positions the board 900 at an oblique angle to the original boards 902, 904 (see FIG. 21A). Once the board 900 has been so placed, it can be rotated into a perpendicular orientation (much in the manner that a board might be inserted manually under similar circumstances—see FIG. 21B). This technique can facilitate the placement of boards in tight spaces, particularly given the inconsistency of dimensions, straightness, quality, etc., that can appear in wooden boards.

Longitudinal Movement of Partially Assembled Wall Panel

Figure 20A:
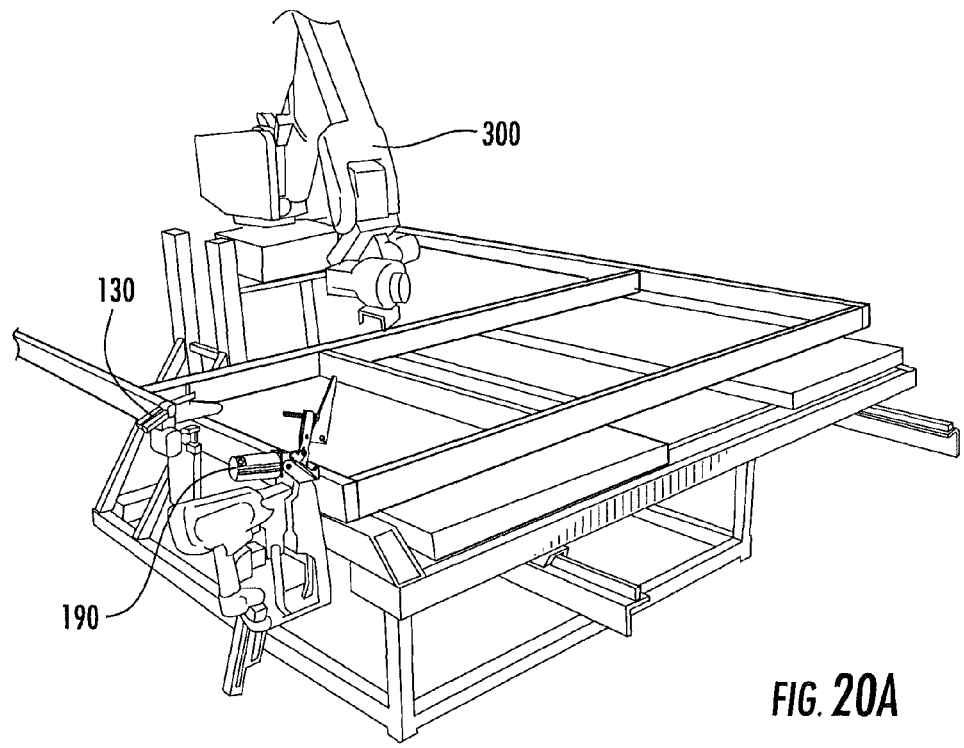
FIGS. 20A-20D are sequential views illustrating the longitudinal movement of a subassembly with the system of FIG. 3.
Figure 20B:
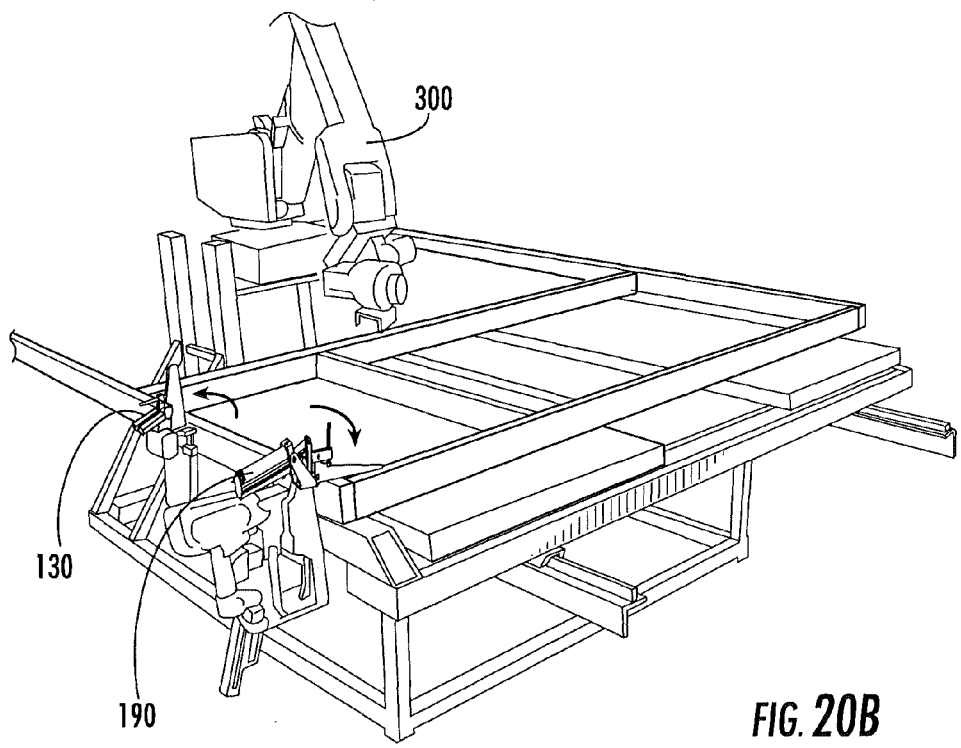
Figure 20C:
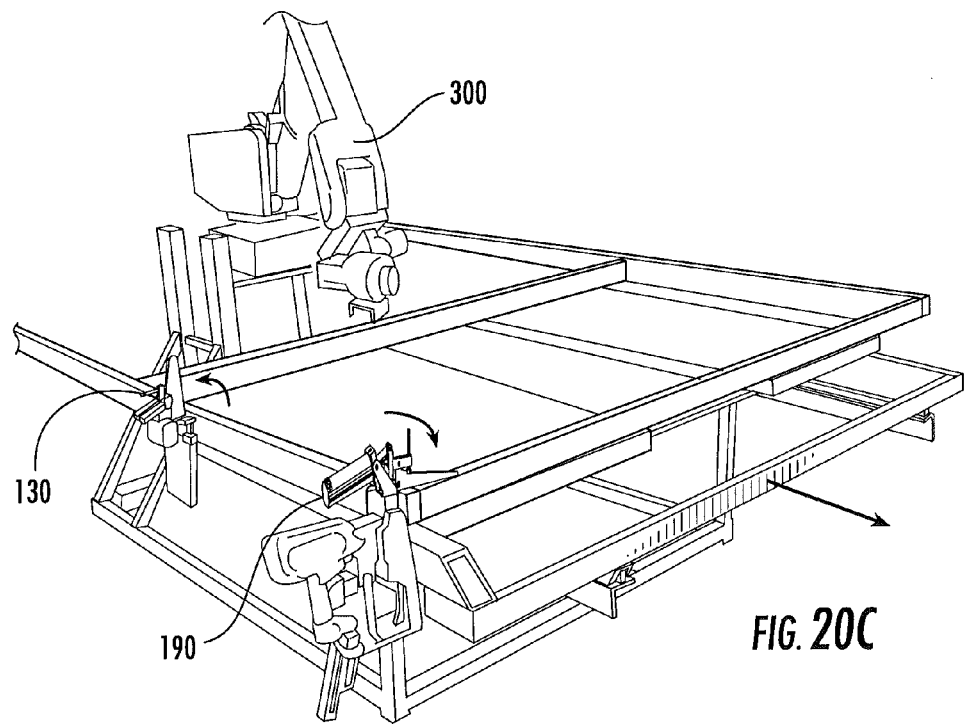
Figure 20D:
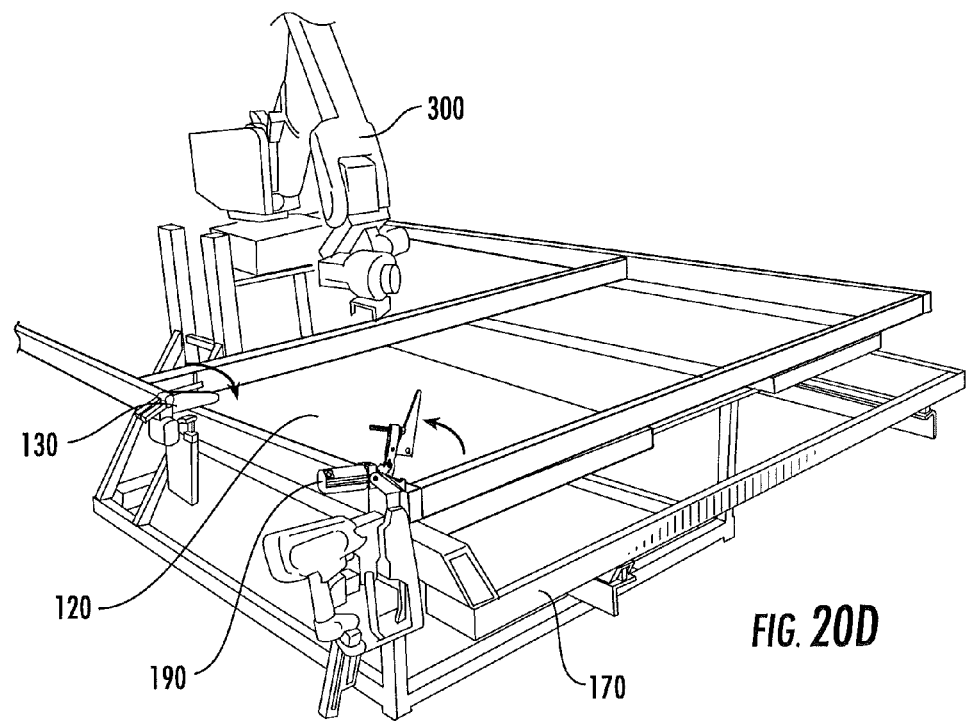

The articulating arm unit 300 has sufficient length to reach the top and bottom planks of a wall panel and some areas of the wall panel, but in many instances the overall length of the wall panel to be constructed exceeds the reach of the articulating arm unit 300. In such an instance, the system can "inchworm" a partially assembled wall panel away from the articulating arm unit 300 to enable additional areas of the wall panel to be assembled. As the initial portion of the wall panel is assembled, the top and bottom planks are secured in place by the top and bottom plank clamping units 130 (see FIG. 20A). When the partial assembly is to be moved, the controller 500 signals the puller clamps 190 on the movable table section 170 to clamp onto the top and bottom planks. The controller signals the clamps 130 on the stationary section 120 to release (see FIG. 20B). The movable table section 170 (driven by the rack-and-pinion mechanism via the servomotor 180) then moves away from the articulating arm unit 300, drawing the partially assembled wall panel with it (see FIG. 20C). If (as is typically the case), the wall panel needs to be moved further, the clamps 130 on the stationary table section 120 clamp the top and bottom planks, the puller clamps 190 release (see FIG. 20D), and the movable table section 170 moves back toward the articulating arm unit 300. Once the movable carriage 170 has completed its movement, as before the puller clamps 190 clamp the top and bottom planks, the clamps 130 release, and the movable table section 170 moves away from the articulating arm unit 300 again. This process is repeated until the partial wall assembly is in the desired position for further assembly. The process can enable the construction of wall panels of almost any reasonable length.

Those skilled in this art will appreciate that longitudinal movement of the subassembly away from the stationary table section may be accomplished in other ways. For example, the system may employ "pinch" rollers that engage one or more of the boards and move a subassembly relative to the stationary table section. Such rollers may also serve to clamp the boards in place during nailing. Other alternatives may also be suitable.

Nailing Studs to Top and Bottom Planks

A large percentage of studs are nailed directly to the top and bottom planks. In many cases, it is preferable for the nailers 600 attached to the movable table section 170 to perform the nailing of the studs to the top and bottom planks, primarily because cycle time is often a paramount concern in the construction of a wall panel, and movement of the articulating arm unit 300 tends to be slower and to consume more time than the movement of the movable table section 170. Therefore, the controller 500 will often direct the system 100 to move the movable table section 170 so that the nailers 600 mounted thereto are positioned to insert nails through the top and bottom planks into the appropriate studs.

"Self-Fixturing" of Boards

Figure 16:
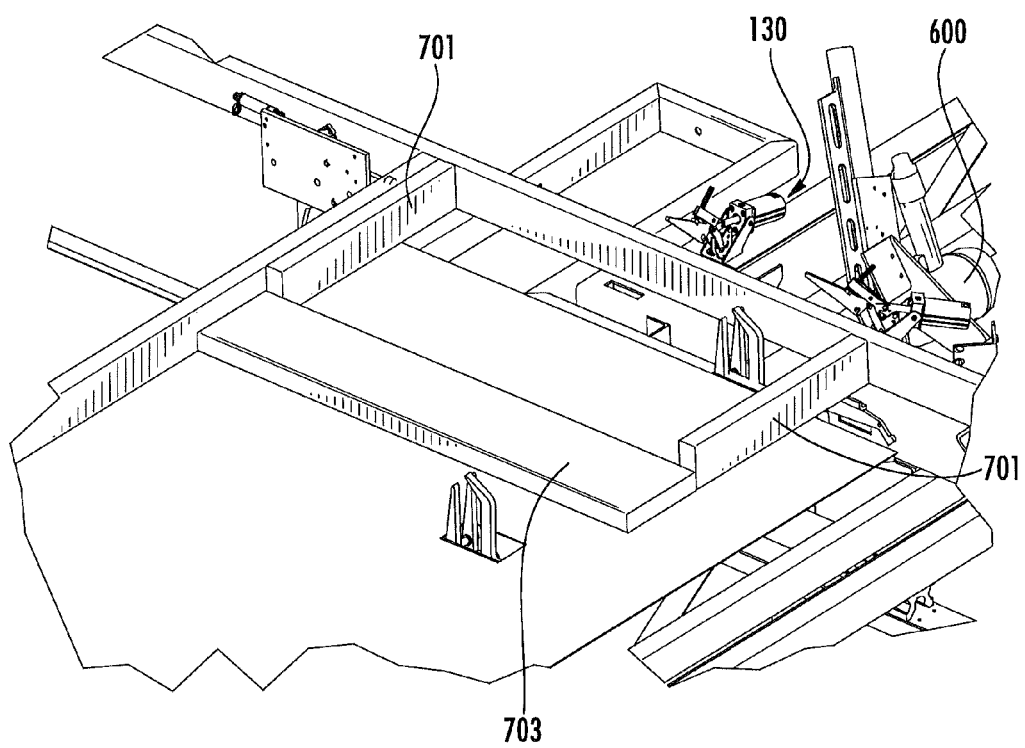
FIG. 16 is a perspective view of two "cripples" serving as self-fixtures for a header board of a wall panel under construction on the system of FIG. 3.

The system 100 has the capacity to enable boards themselves to serve as "fixtures" for other boards, even if the "fixturing" board has not yet been fastened to another board with a nail. As an example, a rough opening may include "cripples" 701 above a header sub-assembly (see FIG. 16). Rather than including a movable stop to provide a rigid locating reference for the header board 703, two or more top "cripples" 701 may be positioned prior to the positioning of the header board 703. The presence of the cripples 701 provides a natural rigid locating reference for the header board 703, after which the header board 703 can be nailed to the cripples 701. As a further example, "trimmer" boards positioned after the header boards can be employed to push the header board into a more accurate position.

Those skilled in this art will recognize that other arrangements may be suitable for self-fixturing, including placing a sill between trimmers during the longitudinal movement of a subassembly.

Longitudinal Clamping

In some instances, it may be desirable to provide clamping in the longitudinal direction of the table 112. This can be achieved by moving the movable table section 170 toward the articulating arm unit 300 when the stud clamps 150 are actuated to an extended position. At the same time, either of the stops 124 or the clamping members 164 (which are biased to extend upwardly) can provide resistance to movement by a stud toward the articulating arm unit 300. Thus, pressure on one or more boards that extend transversely on the table 112 can be applied by the stud clamps 150 (pressing toward the articulating arm unit 300) and the stops 124 or clamping members 164 (resisting the pressure applied by the clamps 150). The clamped position is shown in FIG. 9A. These actions can secure the stud for nailing, fixturing, or some other operation. One skilled in this art will recognize that the clamping may be achieved by other means, such as pneumatic actuation with a long stroke.

Joining of Closely Adjacent Studs

Figure 18A:
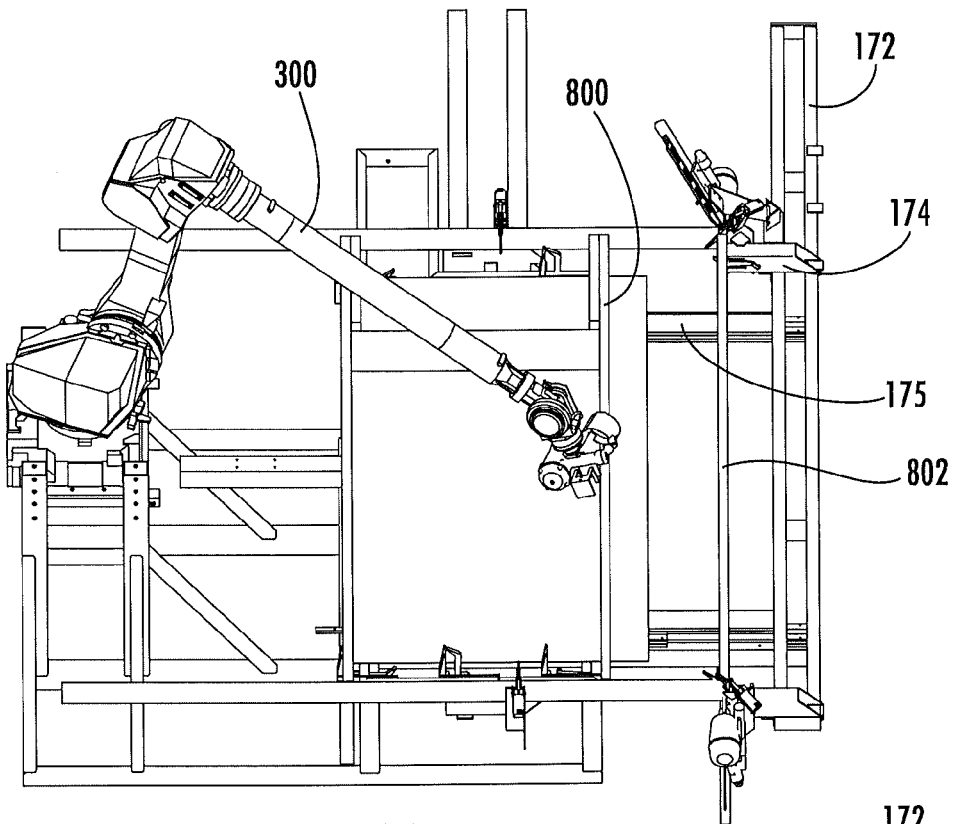
FIGS. 18A and 18B are top views of the system of FIG. 3 showing how a subassembly of the top and bottom planks and multiple studs may be moved away from a rough opening stud in order to provide room for nailing of the rough opening stud.
Figure 18B:
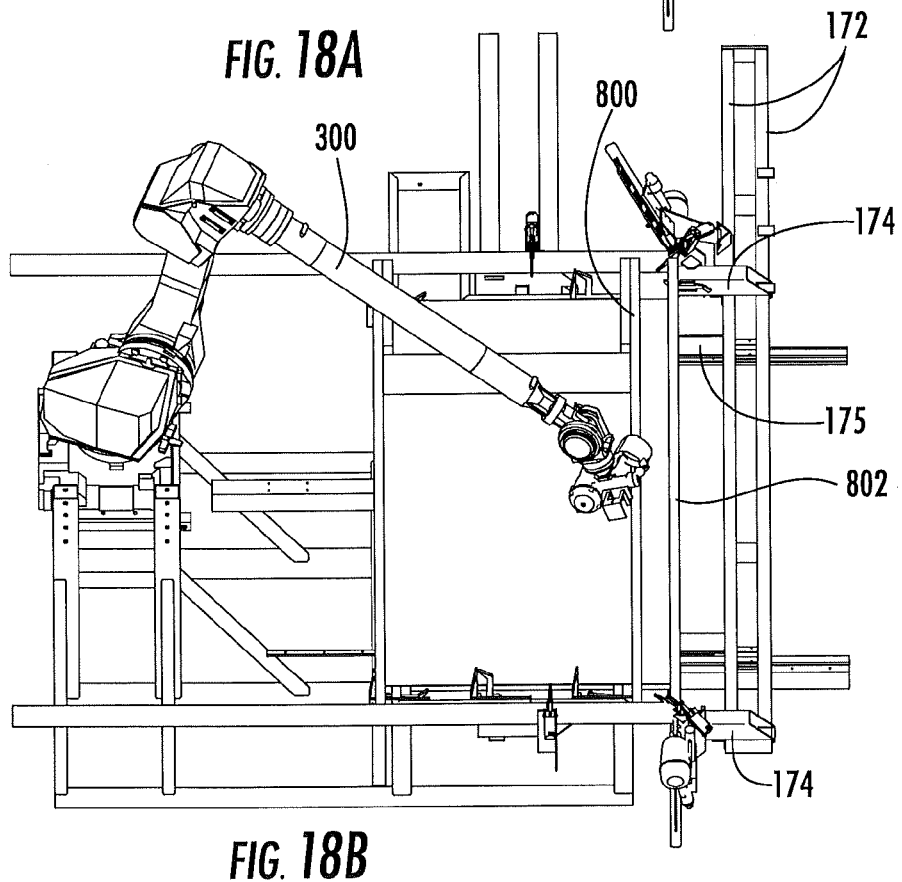

In some instances, the design of a rough opening, such as a window, will dictate that two studs be positioned very closely together. For example, a "king stud" 800 may be attached to a header when another stud 802 is within 10 inches or so of the king stud 800. In such instances, it may be difficult, if not impossible, to position the gripper/nailer 200 properly to nail one or both of the studs in position because of interference by the other stud. This issue can be addressed by moving an entire subassembly in the manner described above, including the top and bottom planks, away from the articulating arm unit 300 a sufficient distance that the gripper/nailer 200 can access the king stud 800 and insert nails into it (see FIG. 18A), then moving the previously-moved subassembly back to its original position and nailing it to the just completed subassembly (see FIG. 18B). This capability may be particularly useful when "self-fixturing" is employed.

Process Flow

FIG. 19 illustrates an exemplary process algorithm for the controller 500 to follow in directing the construction of a wall panel. The controller receives a data file of a wall panel (block 902), typically from a CAD drawing or the like. The controller then determines the top left and bottom right positions of each board (block 904), then calculates the board size, length, orientation and/or use and the board' front, right and center position data (block 906). The board source is identified (i.e., rack or saw) (block 908), and the board data is sorted to create a nominal build sequence (block 910).

Boards are grouped according to their association with a rough opening, as these may be treated differently (block 912). After this grouping, the board sequence may be re-ordered to capitalize on certain nailing opportunities, such as self-fixturing, nails that on different boards that are near each other, and the like (block 914).

Assembly begins with the selection of a board (block 916). The nailing requirements of the board are determined based on its use and location (block 918). The board is then retrieved from the source (block 920). The controller 500 then determines whether any movement of the movable carriage 170 is required (e.g., whether the top and bottom planks should be moved, or if the pusher clamps 192 may be called for) (block 922). The nominal motion path for the board is then adjusted if necessary, taking into account parameters such as the size and orientation of the board and potential interference with other boards or fixtures (block 924). Any movement of the movable carriage 170 then occurs, as does any needed clamping, and the board is positioned (block 926). If any nailing is to be performed prior to the selection of the next board, it occurs next (block 928). This step may also include movement of the movable carriage 170 (particularly if the pusher clamps 192 are used), and setting of clamps. The controller then determines if the wall panel is complete (block 930), and if it is not, the process loops back to block 916 for the addition of more boards.

The flowcharts and block diagrams of certain of the figures herein illustrate the architecture, functionality, and operation of possible implementations of safety and/or diagnostic systems according to the present invention. In this regard, each block in the flow charts or block diagrams represents a module, segment, or portion of code, which comprises one or more executable instructions for implementing the specified logical function(s). It should also be noted that in some alternative implementations, the functions noted in the blocks may occur out of the order noted in the figures, or some functions may be omitted. For example, two blocks shown in succession may in fact be executed substantially concurrently or the blocks may sometimes be executed in the reverse order, depending upon the functionality involved.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as recited in the claims. The invention is defined by the following claims, with equivalents of the claims to be included therein.

That which is claimed is:

1. A method of constructing a wall panel comprising a plurality of structural members, comprising the steps of:
    (a) providing a horizontal table configured to support structural members as the structural members are being formed into a wall panel, the table including a stationary section and a movable carriage that is configured to move in a longitudinal direction relative to the stationary section;
    wherein at least one first clamping unit is mounted to the stationary section for clamping structural members thereto; and at least one section clamping unit mounted to the movable carriage for clamping structural members thereto;
    (b) forming a subassembly of structural members, wherein at least one structural member of the subassembly of structural members is clamped with the first clamping unit;
    (c) clamping the at least one structural member with the second clamping unit;
    (d) releasing the first clamping unit; and
    (e) moving the movable carriage relative to the stationary section to move the subassembly longitudinally relative to the stationary section as the subassembly is clamped with the second clamping unit.

2. The method defined in claim 1, further comprising the steps of:
    (f) clamping the structural member with the first clamping unit; and
    (g) releasing the structural member with the second clamping unit.

3. The method defined in claim 2, comprising repeating steps (c)-(g) to further move the subassembly longitudinally relative to the stationary table section.

4. The method defined in claim 1, wherein the structural members are wooden boards, and further comprising the step of nailing two boards together between steps (e) and (f).

5. The method defined in claim 4, further comprising the step of providing an articulated arm unit with a nailer; and wherein the nailing step comprises nailing the boards together with the nailer.

6. The method defined in claim 5, wherein a second nailer is mounted on the moving carriage.

7. The method defined in claim 5, wherein the articulating arm is mounted to be fixed relative to the stationary stable section, and wherein the movable section moves the subassembly relative to the articulating arm.

8. The method defined in claim 4, wherein the boards define a wall panel.

9. The method defined in claim 8, wherein the wall panel includes a rough opening.

10. The method defined in claim 8, wherein two of the boards define the top and bottom chords of the wall panel, and wherein the second clamping units clamp the top and bottom chords.

11. The method defined in claim 1, wherein two first clamping units and two second clamping units are provided, wherein one first and one second clamping unit are positioned on one side of the stationary table section and another first and another second clamping unit are positioned on an opposite side of the stationary table section.

* * * * *